United States Patent
Tochio et al.

(10) Patent No.: US 6,760,147 B2
(45) Date of Patent: Jul. 6, 2004

(54) CONTROL APPARATUS AND CONTROL METHOD OF OPTICAL SIGNAL EXCHANGER

(75) Inventors: Yuji Tochio, Kawasaki (JP); Kazuyuki Mori, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/353,018

(22) Filed: Jan. 29, 2003

(65) Prior Publication Data

US 2003/0210454 A1 Nov. 13, 2003

(30) Foreign Application Priority Data

May 8, 2002 (JP) ........................................ 2002-132833

(51) Int. Cl.[7] ............................................ G02B 26/00
(52) U.S. Cl. ........................ 359/292; 359/290; 359/291
(58) Field of Search ................................ 359/290, 291, 359/292, 237, 223, 230; 385/17, 18, 16, 52

(56) References Cited

U.S. PATENT DOCUMENTS

| | | | |
|---|---|---|---|
| 6,137,941 A | 10/2000 | Robinson | 385/140 |
| 6,263,123 B1 | 7/2001 | Bishop et al. | 385/15 |
| 6,337,760 B1 | 1/2002 | Huibers et al. | 359/291 |
| 6,429,976 B1 * | 8/2002 | Yamamoto et al. | 359/641 |
| 6,539,142 B2 * | 3/2003 | Lemoff et al. | 385/18 |
| 6,549,691 B1 * | 4/2003 | Street et al. | 385/18 |
| 2003/0081283 A1 * | 5/2003 | Ishizuka et al. | 359/124 |

FOREIGN PATENT DOCUMENTS

| | | |
|---|---|---|
| JP | 2002-236264 | 8/2002 |
| WO | 0 565 276 B1 | 6/1999 |
| WO | WO 01/95009 A2 | 12/2001 |
| WO | WO 01/95013 A2 | 12/2001 |

OTHER PUBLICATIONS

Communication from the European Patent Office dated Feb. 21, 2003, including a European Search Report.

* cited by examiner

Primary Examiner—Ricky Mack
Assistant Examiner—Brandi Thomas
(74) Attorney, Agent, or Firm—Staas & Halsey LLP

(57) ABSTRACT

The present invention aims at providing a control apparatus and a control method of an optical signal exchanger, capable of controlling an optical output level to be constant even when performing the switching of channels with different optical input levels. To this end, according to the control apparatus of the optical signal exchanger, in a three-dimensional type optical signal exchanger using a set of MEMS mirror arrays each having a plurality of tilt mirrors arranged on a plane, each tilt mirror having a reflecting surface an angle of which is controllable, power of an optical signal sequentially reflected by the respective MEMS mirror arrays and output from a specific position is detected by an optical power detection section, and the angle of the reflecting surface of the tilt mirror that has reflected the optical signal is feedback controlled, so that an absolute value of a difference between a previously set target value and the output light power becomes minimum.

15 Claims, 19 Drawing Sheets

CONFIGURATION EXAMPLE OF CONTROL APPARATUS ACCORDING TO SECOND EMBODIMENT OF PRESENT INVENTION

CONFIGURATION EXAMPLE OF CONTROL APPARATUS ACCORDING TO FIRST EMBODIMENT OF PRESENT INVENTION

OVERALL CONFIGURATION OF FIRST EMBODIMENT OF PRESENT INVENTION

FIG.3
CONCEPTUAL DIAGRAM FOR CASE OF CONTROLLING
OUTPUT LIGHT POWER TO MAXIMUM
(A)
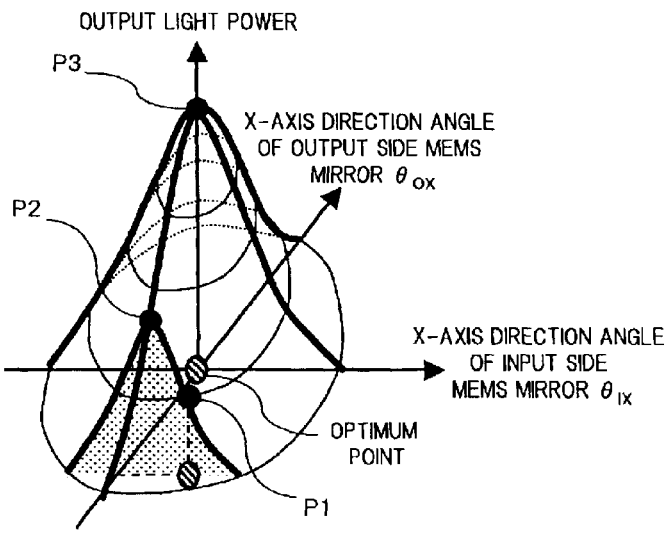
(B)
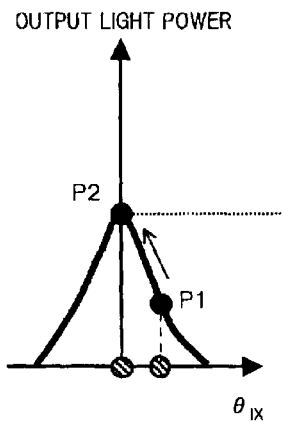
(C)
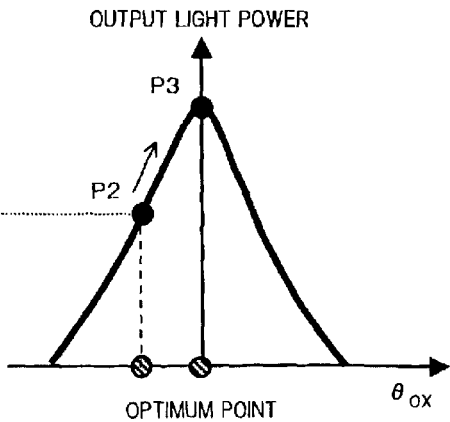

CONFIGURATION EXAMPLE OF CONTROL APPARATUS ACCORDING TO SECOND EMBODIMENT OF PRESENT INVENTION

CONCEPTUAL DIAGRAM TO EXPLAIN OPERATION OF SECOND EMBODIMENT OF PRESENT INVENTION

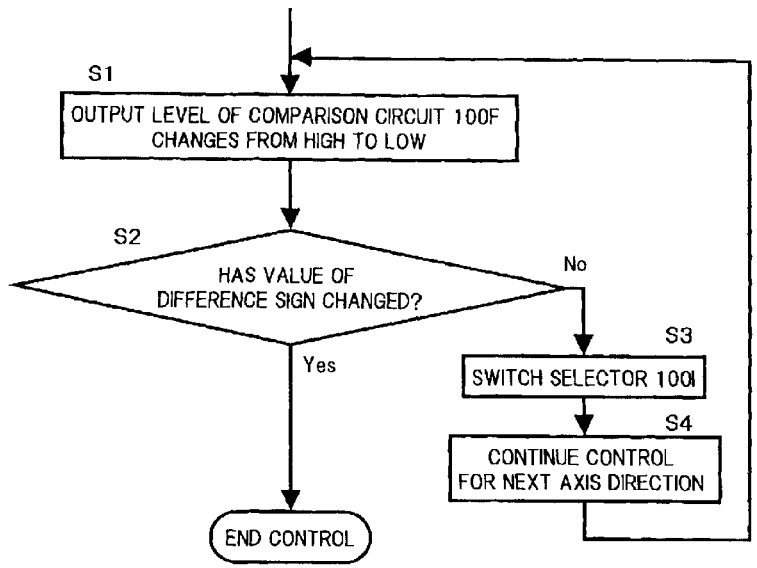
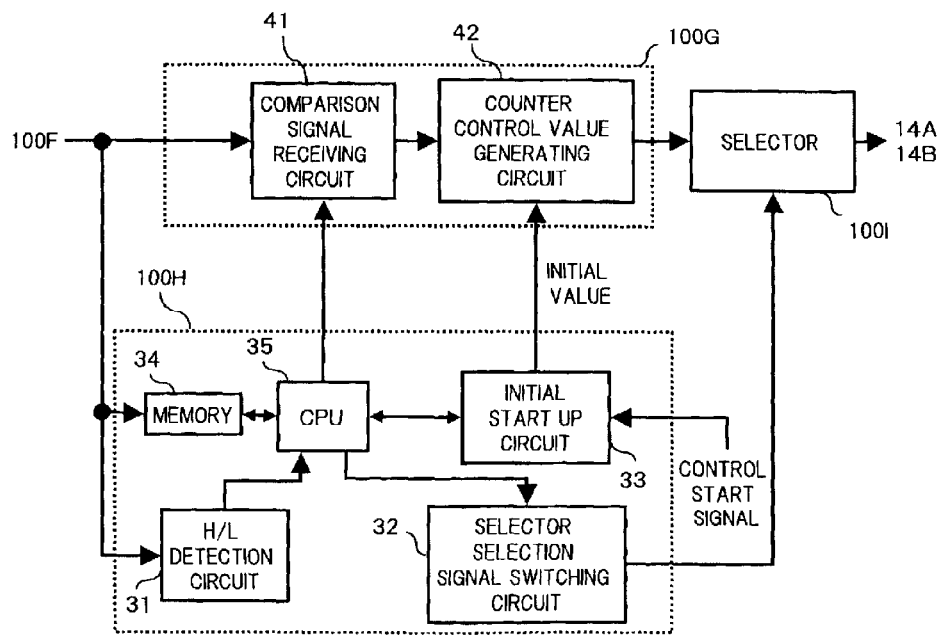

CONFIGURATION EXAMPLE OF CONTROL APPARATUS ACCORDING TO FOURTH EMBODIMENT OF PRESENT INVENTION

CONFIGURATION EXAMPLE OF COMPARISON CONTROL
SECTION ACCORDING TO FIFTH EMBODIMENT OF PRESENT INVENTION

CONFIGURATION EXAMPLE OF COMPARISON CONTROL
SECTION ACCORDING TO SIXTH EMBODIMENT OF PRESENT INVENTION

CONFIGURATION EXAMPLE OF TYPICAL THREE-DIMENSIONAL
TYPE OPTICAL SIGNAL EXCHANGER

DIAGRAM FOR EXPLAINING PROBLEMS
OF CONTROL FOR MINIMIZING OPTICAL LOSS

CONTROL APPARATUS AND CONTROL METHOD OF OPTICAL SIGNAL EXCHANGER

BACKGROUND OF THE INVENTION

1. Field of the Invention

The present invention relates to a switching control technique for an optical signal exchanger, and in particular relates to a control apparatus and a control method of an optical signal exchanger that uses a reflecting tilt mirror made by micromachining (MEMS: Micro Electric Mechanical System) technology.

2. Description of the Related Art

Recently, with the increase in traffic on the Internet and the like, a demand for optical networks is increasing. Under such circumstances, attention is being paid to the introduction of optical signal exchangers that switch data of high speed and high volume just as in an optical signal state. As a conventional technique for realizing a high speed and high capacity optical signal exchanger, for example a system mechanically switching an optical fiber or a system constituted by combining waveguides, has been predominant. However, in this conventional technique, it is necessary to adopt a multistage constitution. Therefore, an optical loss inside the optical signal exchanger is very significant, and further, there is also a limit to deal with an increase in the number of channels. Consequently, it is difficult to realize an optical signal exchanger that deals with several 10 channels or more.

Under the abovementioned circumstances, an optical switch using a tilt mirror (hereunder referred to as an MEMS mirror) made by applying micromachining (MEMS) technology is predominant compared to other switches, from the point of miniaturization, wavelength independence and polarization independence, and is thus gaining attention. In particular, for example as shown in FIG. 22, an optical signal exchanger of three-dimensional type constituted by combining two collimator arrays 1A and 1B having a plurality of collimators arranged in two dimensions, respectively, and two MEMS mirror arrays 2A and 2B having a plurality of MEMS mirrors arranged in two dimensions, respectively, is expected from the point that a reduction in optical loss, a large capacity and multichannel can be realized.

Regarding the abovementioned three-dimensional optical signal exchanger, the present applicant has proposed a control technique for automatically correcting angular displacement of respective MEMS mirrors to reduce an optical loss (Japanese Unexamined Patent Publication No. 2002-236264). A control apparatus for an optical signal exchanger applied with this control technique, for example as shown in FIG. 23, automatically corrects the angular displacement of reflecting surfaces of respective MEMS mirrors by; detecting in an optical power detection section 12, power of light branched by an optical coupler array 11 provided on a latter stage of an output optical fiber array 10B connected to a collimator 1B on an output side, judges in a comparison control section 13 based on the detection results, coupling states of optical signals with respect to output optical fibers, and controlling respective MEMS mirror drive sections 14A and 14B so that the loss inside the optical signal exchanger become minimum.

However, in this control technique for minimizing the loss inside the optical signal exchanger, when performing the channel switching so that for example an optical path transmitting an optical signal from an input point A to an output point B, is changed to an optical path transmitting an optical signal from an input point A' to an output point B, then as shown in a conceptual diagram of FIG. 24, if an optical input level to the input point A is different from that to the input point A', a level of the optical signal to be output to an identical output point B, is changed before and after the switching. There is a possibility that such a change in the optical output level accompanying the channel switching influences on a system connected to a latter part of the optical signal exchanger. More specifically, this is likely to cause saturation of an optical amplifier or an increase in a bit error rate, or the like.

SUMMARY OF THE INVENTION

The present invention has been accomplished in view of the abovementioned problems, with the object of providing a control apparatus and a control method of an optical signal exchanger, capable of controlling an optical output level to be constant even when performing the switching of channels with different optical input levels.

In order to achieve the abovementioned object, according to the present invention, there is provided a control apparatus of an optical signal exchanger which includes a first mirror array and a second mirror array, each having a plurality of tilt mirrors arranged on a plane, each tilt mirror having a reflecting surface an angle of which is controllable, and which sequentially reflects an input optical signal by the first and second mirror arrays to output from a specific position, for controlling the angle of the reflecting surface of each of the tilt mirrors of the first and second mirror arrays, comprising: an optical power detection unit that detects power of the optical signal output from the specific position; and an angle control unit that controls the angle of at least one of the reflecting surfaces of the tilt mirrors of the first and second mirror arrays, which have reflected the optical signal, so that the optical power detected by the optical power detection unit becomes constant at a target value set corresponding to the specific position.

With such a constitution, the power of the optical signal sequentially reflected by the first and second mirror arrays to be output from the specific position is detected by the optical power detection unit, and the angle of the reflecting surface of one or both of the tilt mirrors positioned on a propagation path of the optical signal is controlled by the angle control unit so that the output light power becomes constant at a previously set target value. As a result, even when the switching is performed on channels with different optical input levels, the optical output level can be controlled to be constant regardless of a change in the optical input level.

Moreover, as a specific constitution for the abovementioned control apparatus, the angle control unit may comprise: a first mirror drive section that changes stepwise the angle of the reflecting surface of each tilt mirror of the first mirror array in a constant control direction; a second mirror drive section that changes stepwise the angle of the reflecting surface of each tilt mirror of the second mirror array in a constant control direction; and a comparison control section that calculates absolute values of differences between the target value and respective values of the output light power that are detected by the optical power detection unit immediately before and after the angle of the reflecting surface is changed by at least one of the first mirror drive section and the second mirror drive section to compare the absolute values with each other, and determines respective control directions in the first mirror drive section and the second mirror drive section based on the comparison result, to feedback control the angle of the reflecting surface so that the absolute values of the differences become minimum. With such a constitution, the angles of the reflecting surfaces of the respective tilt mirrors are feedback controlled based on the absolute value of the difference between the value of the output light power detected by the optical power detection unit and the target value.

Further, as a preferred aspect of the abovementioned control apparatus, the comparison control section may, for respective axes of the reflecting surfaces of the respective tilt mirrors of the first and second mirror arrays, in an initial state before feedback controlling the angles of the reflecting surfaces, investigate to determine the control directions where the value of the output light power detected by the optical power detection unit approximates to the target value, and sequentially switch the feedback control for each axis in accordance with each of the determined control directions. According to such a constitution, after the directions in which the respective axes are to be controlled are preliminarily investigated and determined, the angles of the reflecting surfaces are feedback controlled in accordance with the control directions.

As another preferred aspect of the abovementioned control apparatus, the comparison control section may, for respective axes of the reflecting surfaces of the respective tilt mirrors of the first and second mirror arrays, in an initial state before feedback controlling the angles of the reflecting surfaces, initially set the angles of the reflecting surfaces so that the optical loss with respect to the optical signal output from the specific position becomes minimum, and then feedback control in accordance with an arbitrary control direction with respect to at least one axis of the plurality of axes. According to such a constitution, it becomes unnecessary to perform the above described investigation of the control directions for the respective axes, and hence a control time can be shortened.

The present invention further provides a control method of an optical signal exchanger which includes a first mirror array and a second mirror array, each having a plurality of tilt mirrors arranged on a plane, each tilt mirror having a reflecting surface an angle of which is controllable, and which sequentially reflects an input optical signal by the first and second mirror arrays to output from a specific position, for controlling the angle of the reflecting surface of each of the tilt mirrors of the first and second mirror arrays, comprising the processes of: detecting power of the optical signal output from the specific position; and controlling the angle of at least one of the reflecting surfaces of the tilt mirrors of the first and second mirror arrays, which have reflected the optical signal, so that the optical power detected becomes constant at a target value set corresponding to the specific position.

Other objects, characteristics and advantages of the present invention will become apparent from the following description of embodiments, in conjunction with the appended drawings.

BRIEF DESCRIPTION OF THE DRAWINGS

FIG. 3 is a diagram for explaining a concept in the case where output light power of the optical signal exchanger is controlled to maximum.

FIG. 10 is a flowchart showing a judging method for judging whether the control is to continue or be terminated in the second embodiment.

FIG. 11 is a functional block diagram showing a constitution of an essential part of a comparison control section used in a control apparatus of a third embodiment of the present invention.

DETAILED DESCRIPTION OF THE INVENTION

Hereunder is a description of embodiments of the present invention, based on the drawings.

Figure 1:
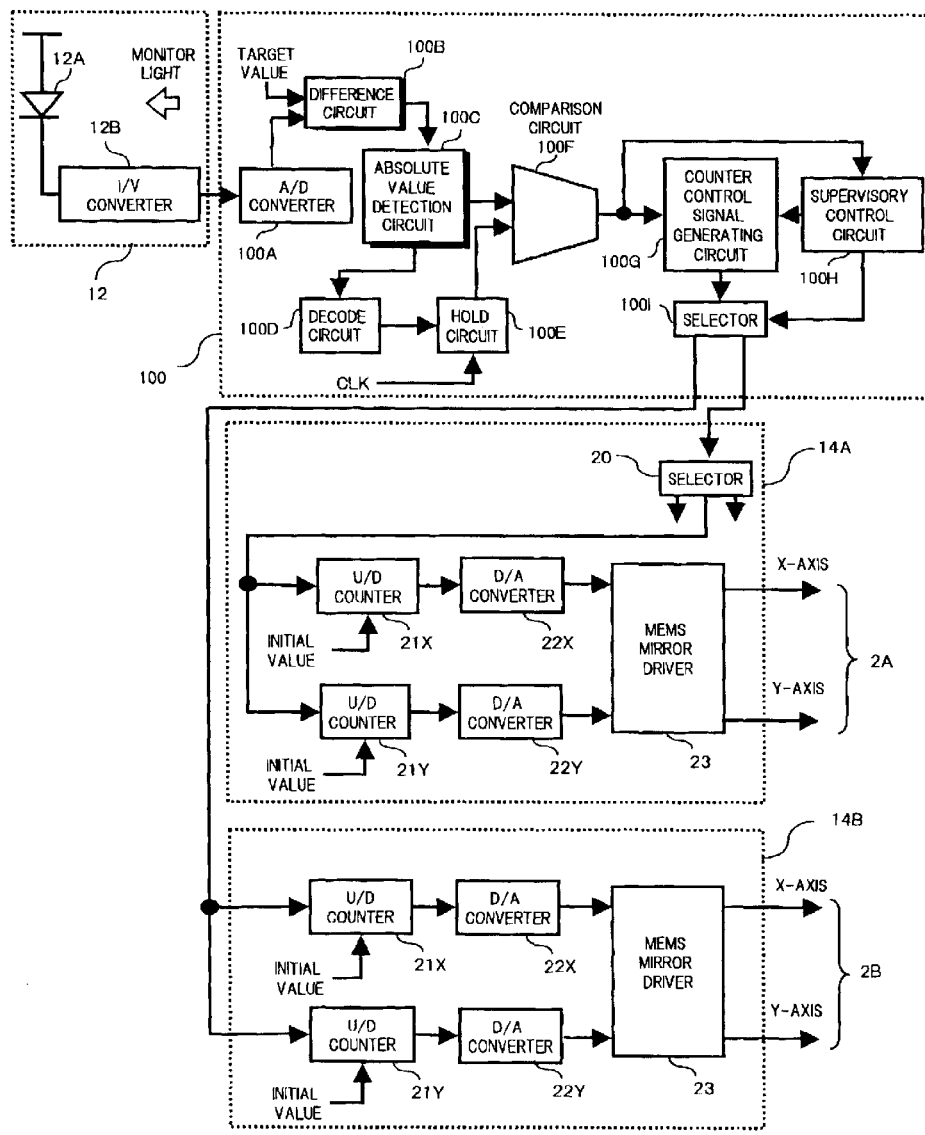
FIG. 1 is a functional block diagram showing a constitution of a control apparatus of an optical signal exchanger according to a first embodiment of the present invention.
Figure 2:
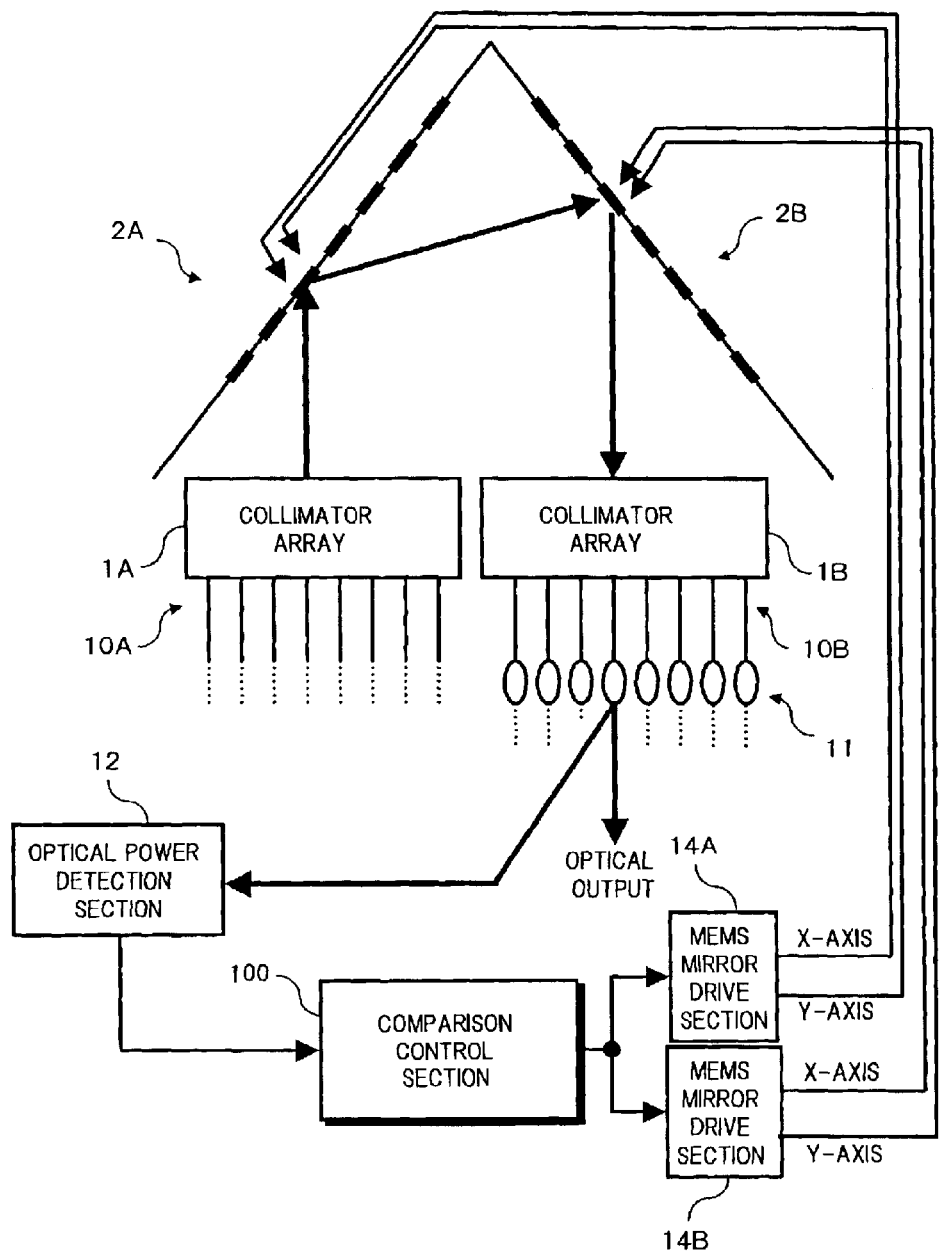
FIG. 2 is a schematic diagram showing an overall configuration of an optical signal exchanger to which the control apparatus of FIG. 1 is applied.
Figure 22:
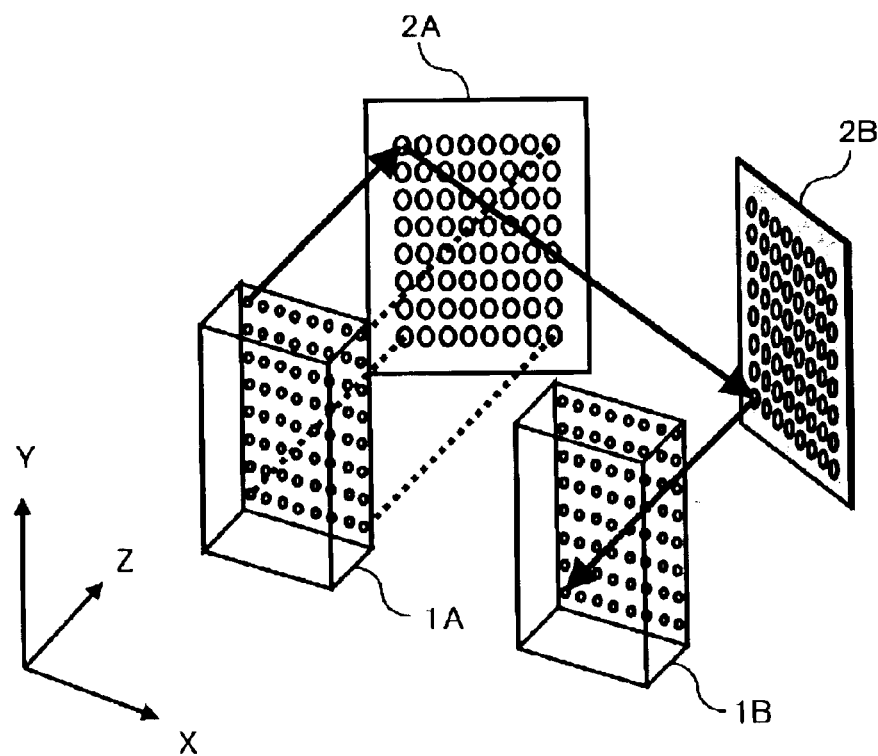
FIG. 22 is a perspective view showing a configuration example of a typical three-dimensional type optical signal exchanger.

FIG. 1 is a functional block diagram showing a constitution of a control apparatus of an optical signal exchanger according to a first embodiment of the present invention. Further, FIG. 2 is a schematic diagram showing an overall configuration of an optical signal exchanger to which the control apparatus of FIG. 1 is applied. Components the same as those in the conventional constitution shown in FIG. 22 and FIG. 23 are denoted by the same reference symbol.

Figure 23:
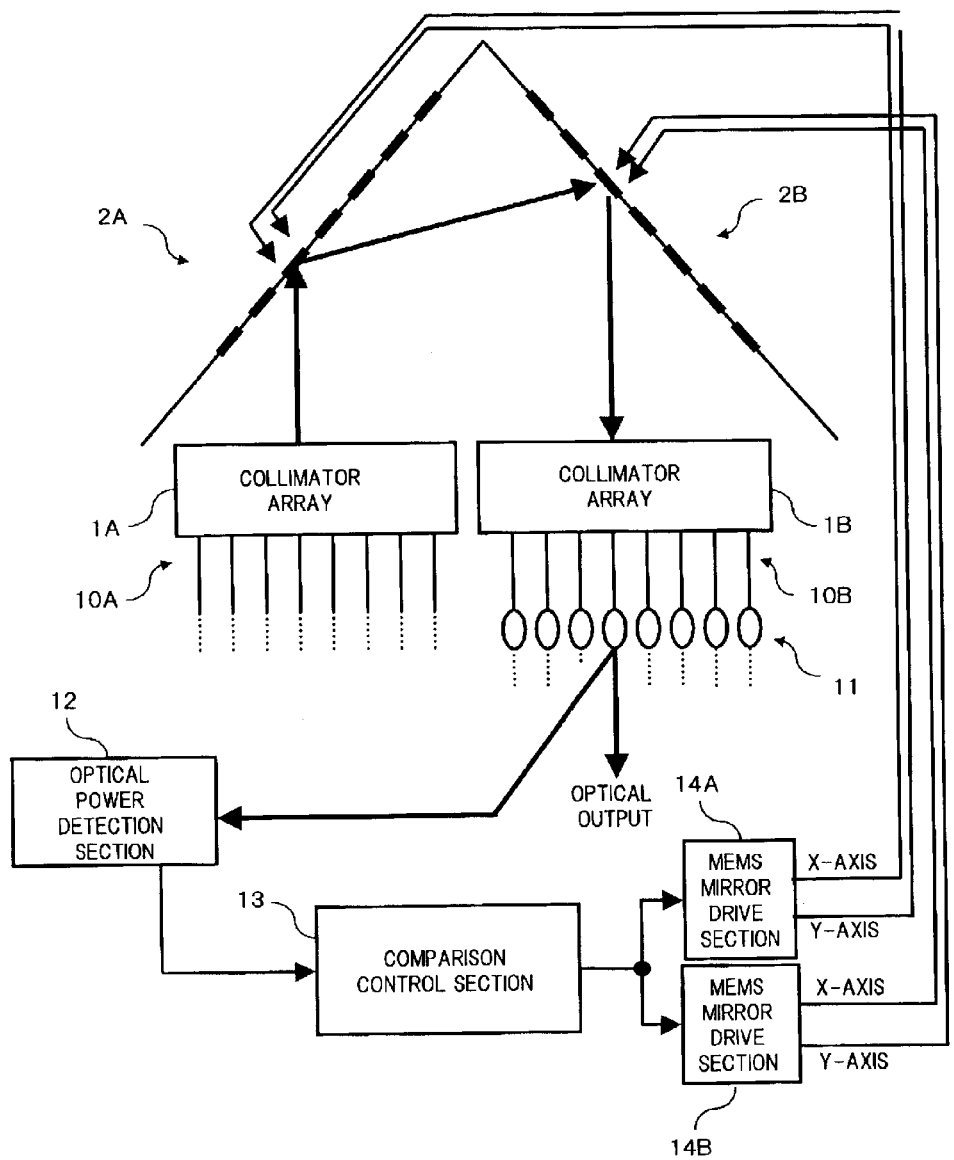
FIG. 23 is a functional block diagram showing a configuration example of a control apparatus for minimizing an optical loss inside an optical signal exchanger.
Figure 24:
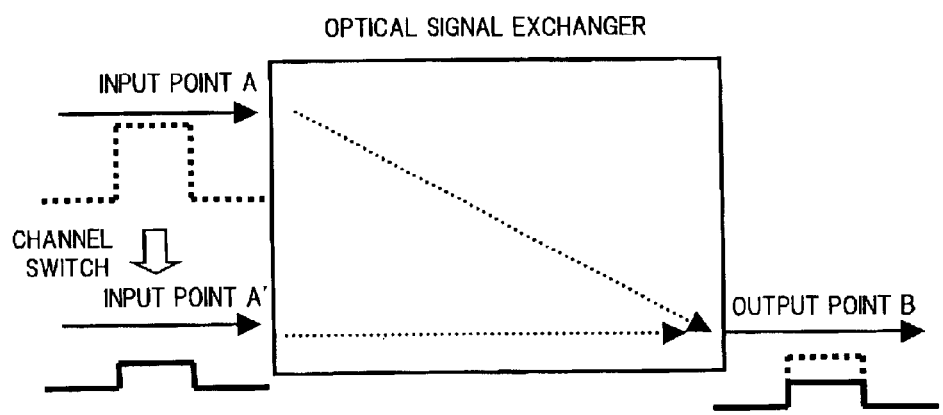
FIG. 24 is a diagram for explaining problems in a control for minimizing an optical loss inside an optical signal exchanger.

In the figures, an overall configuration of this embodiment is one where, for example as with the conventional constitution shown in FIG. 23, in an optical signal exchanger of three-dimensional type constituted by combining two collimator arrays 1A and 1B having a plurality of collimators arranged in two dimensions, respectively, and two MEMS mirror arrays 2A and 2B having a plurality of MEMS mirrors arranged in two dimensions corresponding to the collimators of the collimator arrays 1A and 1B, respectively, there is provided a control apparatus comprising: an optical coupler array 11 provided at a latter stage of an output optical fiber array 10B connected to the collimator array 1B on an output side; an optical power detection section 12 that detects power of light branched by each optical coupler of the optical coupler array 11; and a comparison control section 100 that judges a coupling state of an optical signal with respect to an output optical fiber based on the detection result of the optical power detection section 12, to control respective MEMS mirror drive sections 14A and 14B so that an optical output level becomes a constant.

Here, the MEMS mirror array 2A corresponds to a first mirror array, the MEMS mirror array 2B corresponds to a second mirror array, the MEMS mirror drive section 14A corresponds to a first mirror drive section, and the MEMS mirror drive section 14B corresponds to a second mirror drive section.

The collimator array 1A of the optical signal exchanger is connected with an input optical fiber array 10A having a plurality of optical fibers arranged in two dimensions corresponding to the respective collimators, and light emitted from each input optical fiber passes through each collimator to become parallel light, to be sent towards the MEMS mirror array 2A. Further, the collimator array 1B is connected with an output optical fiber array 10B having a plurality of optical fibers arranged in two dimensions corresponding to the respective collimators, and light reflected by the MEMS mirror array 2B passes through each collimators to be coupled to each output optical fibers.

The MEMS mirror array 2A is arranged to tilt so that the normal direction of a plane on which mirror surfaces of the respective MEMS mirrors are arranged is not parallel to a propagation direction (optical axis direction) of an optical signal sent from the collimator array 1A. Further, the MEMS mirror array 2B is arranged at a required position at which light reflected by the respective MEMS mirrors of the MEMS mirror array 2A is reflected again by the corresponding MEMS mirrors, to be guided to the collimator array 1B. Each of the MEMS mirror arranged in the MEMS mirror arrays 2A and 2B is a known micro tilt mirror made up using micromachining (MEMS) technology. More specifically, for example a movable plate supported by torsion bars and formed with a mirror on an upper surface thereof, is disposed on a silicon substrate integrally, and an oscillation angle of the mirror is variably controlled by rotating the movable plate about the torsion bars with a magnetic force.

In the optical coupler array 11, a plurality of optical couplers are arranged corresponding to the respective output optical fibers of the output optical fiber array 10B, and a part of the optical signal propagated through each output optical fiber is branched by each optical coupler to be sent to the optical power detection section 12.

The optical power detection section 12, for example as shown on an upper left part of FIG. 1, includes a photodetector 12A that receives monitor light branched by each optical coupler of the optical coupler array 11 to generate a current signal corresponding to optical power of the monitor light, and an I/V converter 12B that converts the current signal output from the photodetector 12A into a voltage signal. In FIG. 1, only one set of the photodetector 12A and the I/V converter 12B is shown. However, it is assumed that actually, the optical power detection section 12 is provided with the photodetectors 12A and the I/V converters 12B respectively corresponding to the respective optical couplers of the optical coupler array 11, that is, corresponding to the number of output channels of the optical signal exchanger.

The comparison control section 100, for example as shown at a center top part of FIG. 1, includes an A/D converter 100A, a difference circuit 100B, an absolute value detection circuit 100C, a decode circuit 100D, a hold circuit 100E, a comparison circuit 100F, a counter control signal generating circuit 100G, a supervisory control circuit 100H, and a selector 100I. Here also, only the constitution corresponding to one output channel is shown. However, it is assumed that the actual comparison control circuit 100 comprises a constitution corresponding to the number of output channels of the optical signal exchanger.

The A/D converter 100A is a typical electric circuit that converts an analog voltage signal output from the optical power detection section 12 into a digital signal, and sends the converted digital voltage signal to one input terminal of the difference circuit 100B. The difference circuit 100B that is supplied with a signal indicating a previously set target value at the other input terminal, calculates a difference between an output signal from the A/D converter 100A and the target value, to send the calculation result to the absolute value detection circuit 100C. Setting of the target value to be supplied to the difference circuit 100B will be described later.

The absolute value detection circuit 100C detects an absolute value of the difference calculated by the difference circuit 100B to send the detection result to one input terminal of the comparison circuit 100F, and also to the decode circuit 100D. The decode circuit 100D decodes an output signal from the absolute value detection circuit 100C to output the decoded output signal to the hold circuit 100E. The hold circuit 100E that is input with a clock signal CLK of required frequency, holds the output signal from the decode circuit 100D for a previously set constant time, and thereafter sends it to the other input terminal of the comparison circuit 100F. The time during which the signal is held in the hold circuit 100E, is set for example corresponding to a time during which a feedback control of the respective MEMS mirrors, to be described later, is completed for one cycle.

The comparison circuit 100F is a circuit that performs a large/small comparison of voltage values indicated by the digital signals respectively sent from the absolute value detection circuit 100C and the hold circuit 100E, to transmit the comparison result to the counter control signal generating circuit 100G and the supervisory control circuit 100H. More specifically, the comparison circuit 100F outputs a low level signal if the digital signal (voltage value after control) from the absolute value detection circuit 100C is larger than the digital signal (voltage signal before control) from the hold circuit 100E, for example, while outputting a high level signal if smaller. An output logic level of such a comparison circuit 100F is the reversal of the output logic level of a similar comparison circuit used in the comparison control section 13 in the abovementioned conventional constitution shown in FIG. 23.

The counter control signal generating circuit 100G generates a counter control signal according to the level of the output signal from the comparison circuit 100F. This counter control signal is for controlling count values of U/D counters 21X and 21Y to be described later of the respective MEMS mirror drive sections 14A and 14B. Here, the counter control signal generated by the counter control signal generating circuit 100G is distributed to the corresponding MEMS mirror drive sections 14A and 14B via the selector 100I.

The supervisory control circuit 100H is a circuit for generating, according to the output signal from the comparison circuit 100F, a command for determining whether the counter control signal generating circuit 100G is to supply the counter control signal for increasing the count value (hereunder referred to as a count up signal) or is to supply the counter control signal for reducing the count value (hereunder a count down signal), with respect to the level of the output signal from the comparison circuit 100F, to transmit the command to the counter control signal generating circuit 100G and the selector 100I.

The MEMS mirror drive section 14A is for drive controlling the MEMS mirror array 2A on an input side of the optical signal exchanger. More specifically, the MEMS mirror drive section 14A includes, for example as shown at a center part of FIG. 1, a selector 20, the U/D counter 21X and a D/A converter 22X corresponding to an X-axis direction, the U/D counter 21Y and a D/A converter 22Y corresponding to a Y-axis direction, and an MEMS mirror driver 23, corresponding to the respective MEMS mirrors of the MEMS mirror array 2A. Further, the MEMS mirror drive section 14B is for drive controlling the MEMS mirror array 2B on an output side of the optical signal converter. More specifically, the MEMS mirror drive section 14B includes, for example as shown at a bottom part of FIG. 1, the U/D counter 21X and a D/A converter 22X corresponding to the X-axis direction, the U/D counter 21Y and a D/A converter 22Y corresponding to the Y-axis direction, and an MEMS mirror driver 23, corresponding to the respective MEMS mirrors of the MEMS mirror array 2B. In the respective MEMS mirror drive sections 14A and 14B of FIG. 1, only the constitution corresponding to one MEMS mirror (one channel) is shown.

The selector 20 provided in the MEMS mirror drive section 14A, according to the counter control signal from the comparison control section 100, selects the MEMS mirror being a control object, from the plurality of MEMS mirrors arranged in the MEMS mirror array 2A, to transmit the counter control signal to a circuit block corresponding to the selected MEMS mirror. This selection operation of the selector 20 is set as a result that the selector 20 is given with information related to an input channel corresponding to the output channel of the light detected by the optical power detection section 12. The selector 20 as described above is not provided in the MEMS mirror drive section 14B. This is because once the output channel of the light detected by the optical power detection section 12 is determined, the MEMS mirror corresponding to this output channel is specified from the MEMS mirrors of the MEMS mirror array 2B.

The U/D counter 21X provided in each of the MEMS mirror drive sections 14A and 14B increases or decreases the count value for the X-axis direction of the MEMS mirror in accordance with the counter control signal from the comparison control section 100, to output the increased or decreased count value to the D/A converter 22X. The D/A converter 22X converts the digitally represented count value from the U/D counter 21X into an analog value, to output to the MEMS mirror driver 23. Further, the U/D counter 21Y increases or decreases the count value for the Y-axis direction of the MEMS mirror in accordance with the counter control signal from the comparison control section 100, to output the increased or decreased count value to the D/A converter 22Y. The D/A converter 22Y converts the digitally represented count value from the U/D counter 21Y into an analog value, to output to the MEMS mirror driver 23.

It is desirable that an initial counter value previously set according to the input/output channel is supplied to each of the U/D counters 21X and 21Y in order to improve a mirror adjustment speed, that is, to shorten a feedback time. A specific setting method of this initial counter value will be described later.

The MEMS mirror driver 23 provided in each of the MEMS mirror drive sections 14A and 14B generates a signal for drive controlling an angle in the X-axis direction or the Y-axis direction of the corresponding MEMS mirror, in accordance with the counter value corresponding to each axis direction. The drive control signal generated by each of the MEMS mirror drive sections 14A and 14B is supplied to the corresponding MEMS mirror of each of the MEMS mirror arrays 2A and 2B to thereby adjust an angle of a reflecting surface.

Next is a description of an operation of the first embodiment.

Firstly, a relationship between the power of the optical signal coupled to the output optical fiber, and an angle between the MEMS mirrors on the input side and the output side, will be described referring to a characteristic diagram of FIG. 3.

For the optical signal exchanger having the three-dimensional constitution shown in FIG. 22, as shown in (A) of FIG. 3, the characteristic thereof is confirmed that an optimum point of the mirror angle where the output light power becomes maximum, coincides with a point where the output light power for the MEMS mirrors on the input side and the output side each become maximized, and a change in the output light power relative to an angle change in the input side MEMS mirror, and the change in the output light power relative to an angle change in the output side MEMS mirror are not mutually dependent, to be in an independent relationship.

In FIG. 3, there is shown an aspect of the change in the output light power for when the angle of each MEMS mirror is changed in the X-axis direction. However, the above characteristic is also confirmed for when the angle of each MEMS mirror is changed in the Y-axis direction. Further, the change characteristic of the output light power for when the angle of the input side MEMS mirror in the X-axis (Y-axis) direction and the angle of the output side MEMS mirror in the Y-axis (X-axis) direction are changed is also the same as the above described characteristic. Moreover, the change characteristic of the output light power for when the angles in the X-axis and Y-axis directions of the MEMS mirror on one side are changed is also the same as the above described characteristic. Hereunder, the description is given assuming the case where the angles of the input side and output side MEMS mirrors in the X-axis direction are changed (the angle in the Y-axis direction is fixed). However, the same consideration can be made for the abovementioned other combinations.

In the case of the abovementioned conventional control technique, the angles of the respective MEMS mirrors on the input side and the output side are optimized so that an optical loss in the optical signal exchanger becomes minimum, that is, the power of the optical signal coupled to the output optical fiber becomes maximum. In this case, for example in a state where the output light power as shown by a point P1 of (A) of FIG. 3 is obtained, at first as shown in (B) of FIG. 3, the angle of the output side MEMS mirror is fixed and the angle of the input side MEMS mirror is adjusted, to thereby realize a state of point P2 where the output light power becomes maximized. Then, as shown in (C) of FIG. 3, the angle of the input side MEMS mirror is fixed, and the angle of the output side MEMS mirror is adjusted, to thereby realize a state of point P3 where the output light power becomes maximized. As a result, the angle of each MEMS mirror can be controlled to the optimum point where the output light power becomes maximum (the optical loss of the optical signal exchanger becomes minimum).

Figure 4:
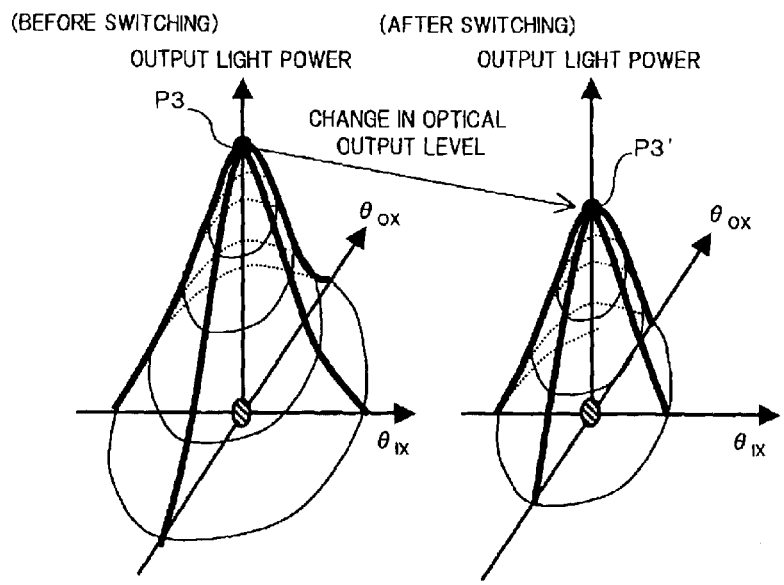
FIG. 4 is a conceptual diagram for explaining a change in optical output level when switched to a channel with a different optical input level.

Incidentally, the output light power obtained under the state where the angle of each MEMS mirror on the input side and the output side is controlled to the optimum point as described above, is increased if an optical input level of the optical signal is high, and is decreased if the optical input level thereof is low. For example, in the case of switching from a channel of high optical input level to a channel of low optical input level by means of the channel switching, the relationship between the output light power of the optical signal coupled to the same output optical fiber and the angle of each MEMS mirror, is changed from the state of before switching as shown on the left side of FIG. 4 to the state of after switching as shown on the right side of FIG. 4. Therefore, is a control for maximizing the output light power (minimizing the optical loss) is applied, the optical output level is changed from the point P3 of before switching to a point P3' of after switching. This change in the optical output level of before and after channel switching may influence on a system connected to a latter stage of the optical signal exchanger, as described above.

Figure 5:
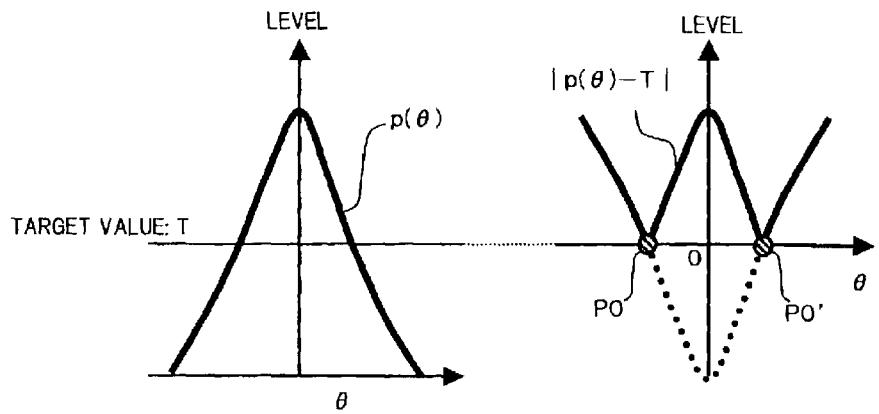
FIG. 5 is a diagram for explaining a concept in the case where the optical output level of the optical signal exchanger is controlled to be constant.

Therefore, in a control system of the optical signal exchanger according to the present invention, a target value of the optical output level for each channel on the output side is previously set, and the angle of each MEMS mirror is feedback controlled so that the output optical level becomes constant at the target value regardless of the change in the optical input level due to the channel switching, to thereby avoid the influence on the latter stage system, due to the change in the optical output level. Such a constant control of the optical output level can be performed based on an absolute value of a difference between the optical output level actually detected and a previously set target value T of the optical output level, as shown for example in a conceptual diagram of FIG. 5. That is to say, when an optical output level $p(\theta)$ corresponding to an angle $\theta$ of the MEMS mirror detected by the optical power detection section 12 has a relationship as shown on the left side of FIG. 5 with respect to the target value T of the optical output level, an absolute value $|p(\theta)-T|$ of the difference of the optical output level $p(\theta)$ to the target value T is changed as shown on the right side of FIG. 5. Therefore, the angle of the MEMS mirror in each axis direction on the input side and the output side is adjusted, in order to realize a state of a point P0 or a point P0' where the absolute value $|p(\theta)-T|$ becomes zero, thereby enabling to control the optical output level to be constant at the target value T.

Figure 6:
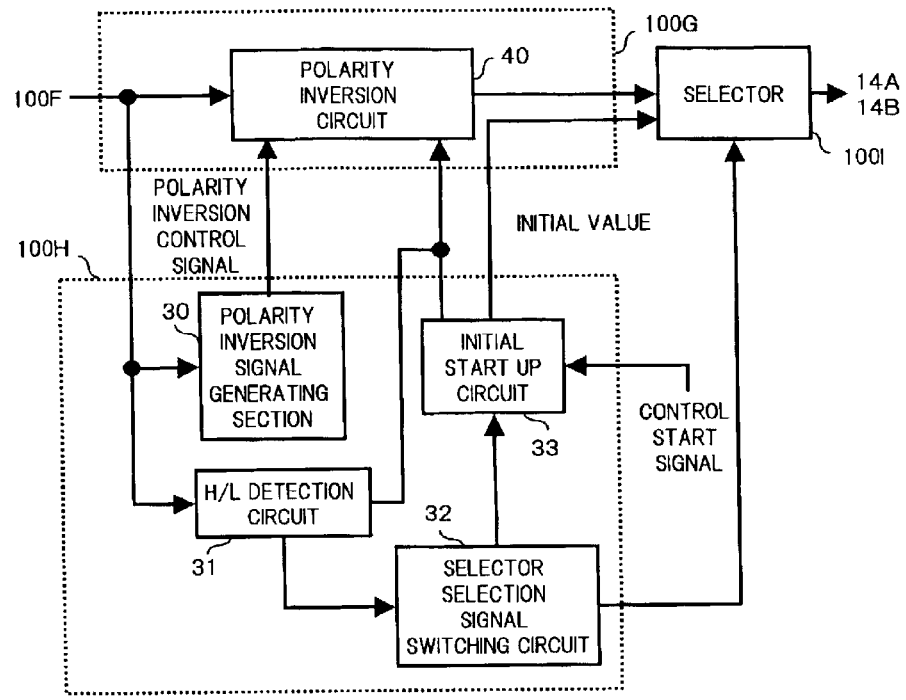
FIG. 6 shows a specific circuit configuration of a counter control signal generating circuit and a control and monitoring circuit used in the first embodiment.

Based on the control system as described above, in the control apparatus of this embodiment, for example a specific circuit configuration as shown in FIG. 6 is applied to the counter control signal generating circuit 100G and the supervisory control circuit 100H of the comparison control section 100, to thereby control the angles of the respective MEMS mirrors.

In the specific example shown in FIG. 6, a polarity inversion circuit 40 is provided as a component of the counter control signal generating circuit 100G. Further, for the supervisory control circuit 100H, a signal indicating the comparison result by the comparison circuit 100F is respectively input to a polarity inversion signal generating section 30 and an H/L detection circuit 31, and a polarity inversion control signal generated by the polarity inversion signal generating section 30 is output to the polarity inversion circuit 40. The H/L detection circuit 31 supervises an output signal level from the comparison circuit 100F, and if a change from a high level to a low level is detected, a signal informing the change is output to a selector selection signal switching circuit 32, and a disable signal for nullifying an operation of the polarity inversion circuit 40 is output to the polarity inversion circuit 40. In the selector selection signal switching circuit 32, it is judged according to the output signal from the H/L detection circuit 31, that the absolute value of the difference of the optical output level to the target value T has become zero, and a selection signal for switching the selector 100I is generated, to be sent to the selector 100I and an initial start up circuit 33. The initial start up circuit 33, when a control start signal for signaling starting of angle correction is input thereto, supplies an initial value to the selector 100I, and also outputs an enable signal to make the operation of the polarity inversion circuit 40 effective. An output condition of the enable signal supplied from the initial start up circuit 33 to the polarity inversion circuit 40 is controlled according to the output signal from the selector selection signal switching circuit 32.

Figure 7:
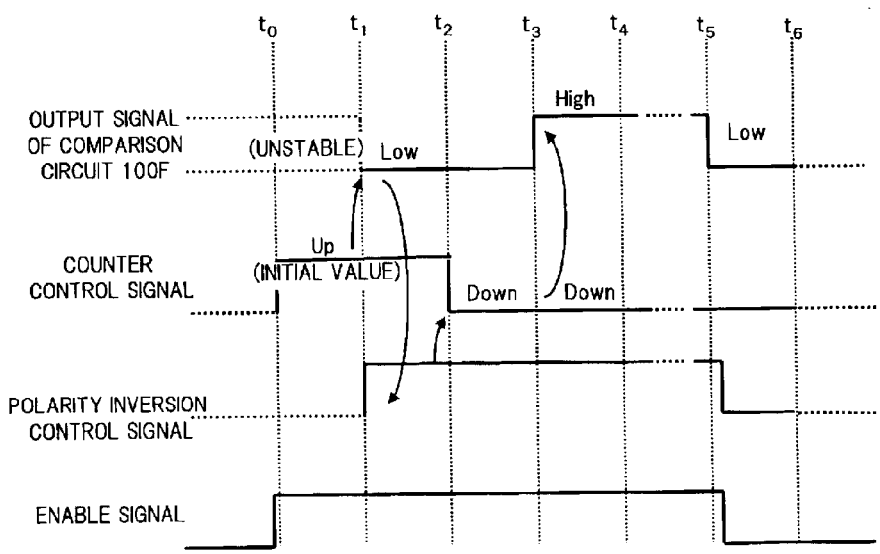
FIG. 7 is a timing chart for explaining an operation of a comparison control section in the first embodiment.

In the comparison control section 100 provided with the abovementioned circuit configuration, for example as shown in a timing chart of FIG. 7, at first, if the control start signal is input to the initial start up circuit 33 at a time $t_0$, the initial start up circuit 33 supplies to the selector 100I as an initial value of the counter control signal, for example, a count up signal for instructing an increase in the count value, and at the same time, supplies the enable signal to the polarity inversion circuit 40. As a result, control operations of the respective sections are started. Here, the setting is such that the count up signal is supplied to the selector 100I as the initial value, however, the setting may be such that a count down signal instructing a decrease in the count value is supplied as the initial value.

The count up signal supplied to the selector 100I is distributed to the respective MEMS mirror drive sections 14A and 14B, and the count up signal sent to the MEMS mirror drive section 14A is further distributed by the selector 20 to be sent to a circuit block corresponding to the MEMS mirror on the input side being the object of angle control. Moreover, the count up signal sent to the MEMS mirror drive section 14B is sent to a circuit block corresponding to the MEMS mirror on the output side being the object of angle control (the channel for which monitoring of the output light power is performed by the optical power detection section 12). Here, considering the case where for example the angle in the X-axis direction of the MEMS mirror on the input side is correction controlled, then at the time of starting the control, the count up signal from the comparison control section 100 is input to the U/D counter 21X on the X-axis side of the MEMS mirror drive section 14A.

In the U/D counter 21X that has received the input of the count up signal, the previously set counter initial value is increased, and this count value is output to the D/A converter 22X to be D/A converted. Then, the output signal from the D/A converter 22X is sent to the MEMS mirror driver 23, and the drive control signal is generated for controlling the angle in the X-axis direction of the MEMS mirror on the input side according to the count value of the U/D counter 21X, to be supplied to the MEMS mirror array 2A. As a result, the angle in the X-axis direction of the corresponding MEMS mirror of the MEMS mirror array 2A on the input side is changed, and a coupling state with respect to the output optical fiber, of the optical signal reflected by the input side MEMS mirror and the output side MEMS mirror corresponding to the input side MEMS mirror is changed. Then, a part of the optical signal coupled to the output optical fiber is branched by the optical coupler 11 to be sent to the optical power detection section 12. In the optical power detection section 12, monitor light from the optical coupler 11 is received by the photodetector 12A, and a current signal according to the optical power is generated and converted into a voltage signal by the I/V converter 12B, to be output to the comparison control section 100.

The voltage signal according to the monitor result of the output light power is converted into a digital signal by the A/D converter 100A of the comparison control section 100, to be sent to the difference circuit 100B. In the difference circuit 100B, the difference between a digital signal indicating the previously set target value of the optical output level, and the digital signal from the A/D converter 100A is calculated, and the calculation result is sent to the absolute value detection circuit 100C. In the absolute value detection circuit 100C, the absolute value of the difference calculated by the difference circuit 100B is detected, and the detection result is sent to the comparison circuit 100F and to the decode circuit 100D. In the comparison circuit 100F that is supplied with a voltage value according to the output light power in the state before changing the angle in the X-axis direction of the input side MEMS mirror, from the hold circuit 100E, a comparison is made between this voltage value and the voltage value from the absolute value detection circuit 100C. Then, in the case where, by changing the angle in the X-axis direction of the input side MEMS mirror, the absolute value of the difference becomes larger, the comparison circuit 100F generates a low level output signal, while in the case where the absolute value of the difference becomes small, the comparison circuit 100F generates a high level output signal.

Here, in the case where, by means of the count up signal supplied to the selector 100I as the initial signal, the absolute value of the difference is changed to decrease, it is necessary to perform the operation setting of the counter control signal generating circuit 100G so as to generate the count up signal for the high level output signal from the comparison circuit 100F, and to generate the count down signal for the low level output signal from the comparison circuit 100F. Further, in the case where the absolute value of the difference is changed to increase, it is necessary to perform the operation setting of the counter control signal generating circuit 100G so as to generate the count down signal for the high level output signal from the comparison circuit 100F, and to generate the count up signal for the low level output signal from the comparison circuit 100F. In order to realize such operation setting of the counter control signal generating circuit 100G, in this embodiment, the polarity inversion signal generating section 30 is provided in the supervisory control circuit 100H. The polarity inversion signal generating section 30 generates to send to the polarity inversion circuit 40, the polarity inversion control signal to inversion operate the polarity inversion circuit 40 when the output signal from the comparison circuit 100F is detected to be at a low level, and not to inversion operate the polarity inversion circuit 40 when the output signal is detected to be at a high level. As a result, in the setting where the polarity inversion circuit 40 is not inversion operated, the output level of the counter control signal generating circuit 100G becomes equal to the level of the output signal from the comparison circuit 100F, and the count up signal of high level is output for the high level output of the comparison circuit 100F, and the count down signal of low level is output for the low level output of the comparison circuit 100F. On the other hand, in the setting where the polarity inversion circuit 40 is inversion operated, the count down signal of low level is output for the high level output of the comparison circuit 100F, and the count up signal of high level is output for the low level output of the comparison circuit 100F.

Here, for example as shown at a time of $t_1$ to $t_2$ in FIG. 7, if the output signal from the comparison circuit 100F becomes a low level with respect to the count up signal as the initial value, the polarity inversion signal of high level is generated for inversion operating the polarity inversion circuit 40. As a result, the counter control signal that has been set to the count up signal of high level as the initial value is switched to the count down signal of low level as shown at a time of $t_2$ to $t_3$, to be sent via the selectors 100I and 20, to the U/D counter 21X of the MEMS mirror drive section 14A. Then, due to the decrease in the count value of the U/D counter 21X, the angle of the input side MEMS mirror is controlled oppositely to the control starting time, and the absolute value of the difference is changed to decrease, and as shown at a time of $t_3$ to $t_4$ in FIG. 7, the output signal from the comparison circuit 100F becomes a high level. This high level output signal from the comparison circuit 100F is inverted by the polarity inversion circuit 40, to be output from the counter control signal generating circuit 100G as the count down signal of low level. In accordance with such a count down signal, the angle adjustment of the input side MEMS mirror is repeated until the absolute value of the difference becomes zero.

When the absolute value of the difference becomes zero, then as shown at a time of $t_5$ to $t_6$ in FIG. 7, the output signal from the comparison circuit 100F is changed to a low level. This change of the output level of the comparison circuit 100F from high to low is detected by the H/L detection circuit 31 of the comparison control section 100, and the signal informing of this change, is sent to the selector selection signal switching circuit 32, and also the enable signal that has been supplied to the polarity inversion circuit 40 is cancelled, and instead, the disable signal is sent to the polarity inversion circuit 40 from the H/L detection circuit 31. Further, the polarity inversion signal output at this time from the inversion signal generating section 30 is cancelled. Then, in the selector selection signal switching circuit 32, based on the input of the signal from the H/L detection circuit 31, it is judged that the angle in the X-axis direction of the input side MEMS mirror is controlled to an optimum condition, and the control is terminated.

Here, it is judged that the angle in the X-axis direction of the input side MEMS mirror is optimized at the point in time when the output signal from the comparison circuit 100F is changed to the low level. However, the constitution may be such that for example the counter control signal is switched from the count down signal to the count up signal in a control cycle for when the output signal from the comparison circuit 100F is changed to the low level, and in the next control cycle, the angle of the input side MEMS mirror is restored so as to be in the condition before the output signal from the comparison circuit 100F is changed to the low level. Whether or not such a control is performed is judged according to accuracy and so forth of the angle control.

According to the control apparatus of the first embodiment as described above, the optical output level of the optical signal exchanger can be maintained constant at the target value irrespective of the change in the optical input level. As a result, the system connected to the latter stage of the optical signal exchanger can be operated stably. If the conventional control for minimizing the optical loss in the optical signal exchanger is applied to realize the abovementioned stable operation of the latter stage system, then it is necessary to provide for example a variable optical attenuator or the like, to adjust the optical output level. However according to the control of the present embodiment, since the abovementioned variable optical attenuator or the like becomes unnecessary, it is also possible to achieve a substantial reduction in the number of parts.

In the abovementioned first embodiment, the angle in the X-axis direction of the input side MEMS mirror has been controlled. However, it is also possible to control the angle in the Y-axis direction of the input side MEMS mirror, or to control the angles in the X-axis and Y-axis directions of the output side MEMS mirror. In the present invention, the MEMS mirrors for which the angle control is performed and the axis directions thereof can be arbitrarily set since, as described in FIG. 3, the change in output light power is independent for each of the respective MEMS mirrors and for each axis direction.

Next is a description of a control apparatus of an optical signal exchanger according to a second embodiment of the present invention.

Figure 8:
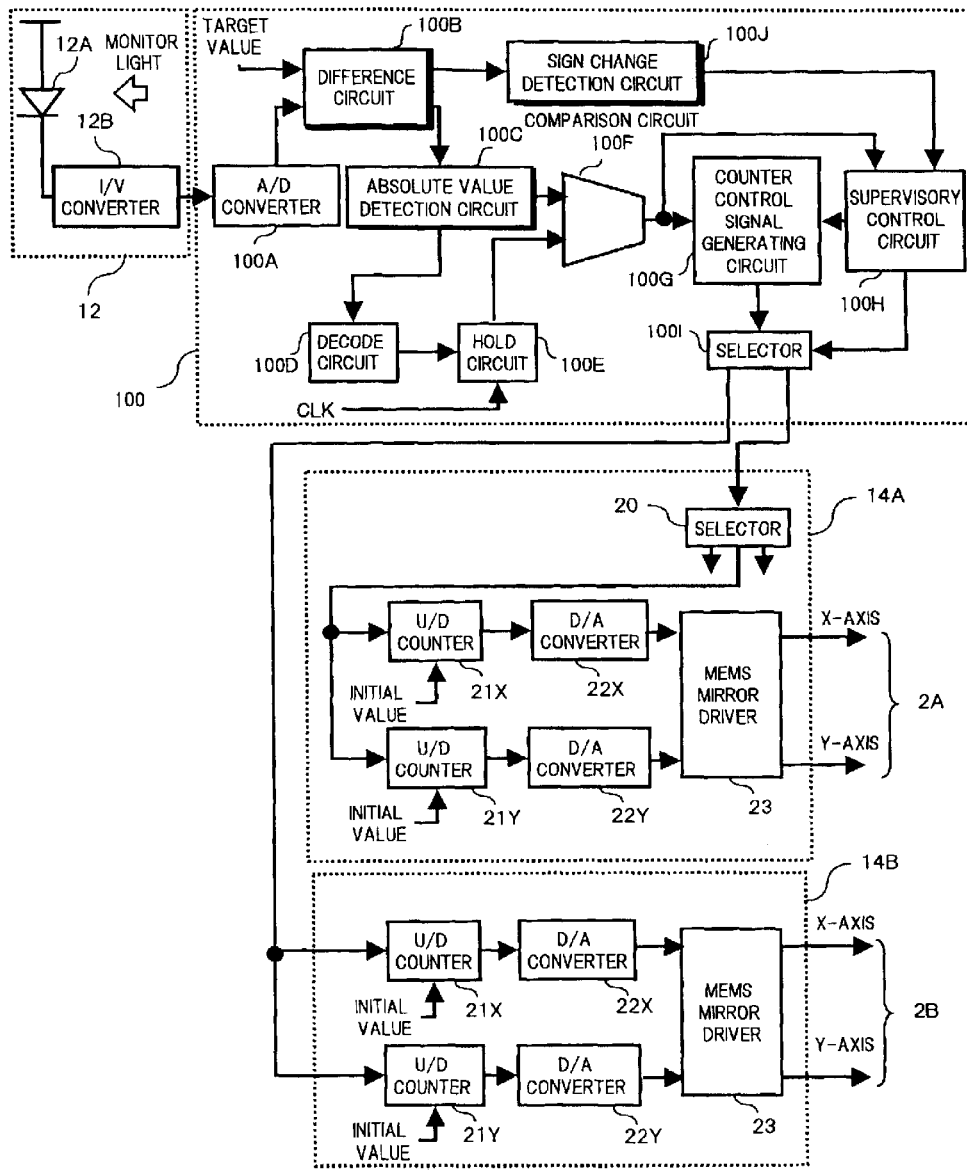
FIG. 8 is a functional block diagram showing a constitution of a control apparatus of an optical signal exchanger according to a second embodiment of the present invention.

FIG. 8 is a functional block diagram showing a constitution of a control apparatus of an optical signal exchanger according to the second embodiment. Components the same as those in the constitution of the first embodiment are denoted by the same reference symbols and description thereof is omitted, with the same applying hereunder to the other embodiments.

In FIG. 8, the part where the constitution of the control apparatus of this embodiment is different to that in the case of the first embodiment is that in the comparison control section 100, there is provided a sign change detection circuit 100J that detects whether or not a sign of the value of the difference calculated by the difference circuit 100B has reversed, and the detection result is transmitted to the supervisory control circuit 100H. Components other than the above are the same as those in the case of the first embodiment.

Figure 9:
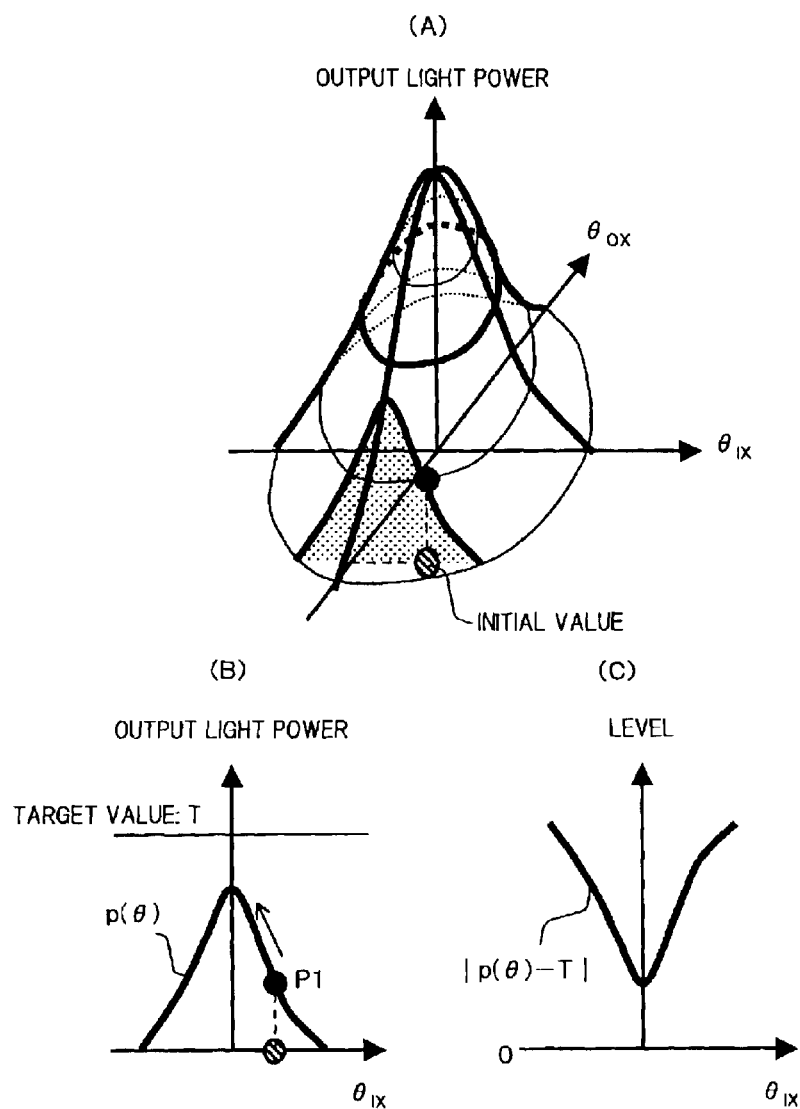
FIG. 9 is a diagram for explaining a concept of a control operation in the second embodiment.

In the first embodiment, for example as shown in (A) of FIG. 9, when the target value of the optical output level is set to a high level, in the case where the initial value supplied to each of the U/D counters 21X and 21Y of the respective MEMS mirror drive sections 14A and 14B is set corresponding to a position greatly apart from the point P3 where the optical output power becomes maximum, then as shown in (B) of FIG. 9, by merely controlling the angle of the MEMS mirror for one axis direction, the maximum level of the optical output power in this axis direction becomes less than the target value. Therefore, at an intermediate stage before reaching the control target, as shown in (C) of FIG. 9, a circumstance may occur where the absolute value of the difference of the optical output power to the target value becomes minimum, that is, the absolute value of the difference does not become zero.

Consequently, in the control apparatus of the second embodiment, whether or not the sign of the value of the difference calculated by the difference circuit 100B of the comparison control section 100 has reversed is detected by the sign change detection circuit 100J, and according to the detection result, it is judged whether to continue or terminate the control. As a result, it is also possible to deal with the abovementioned case where only by the angle control in the single axis direction, the absolute value of the difference does not become zero.

In a specific judgment method as to whether or not to continue or terminate the abovementioned control, for example as shown by a flowchart of FIG. 10, if in step 1 (shown as S1 in the figure and similarly hereunder for other steps) it is detected by the H/L detection circuit 31 (FIG. 6) of the supervisory control circuit 100H that the output logic level of the comparison circuit 100F has been changed from high to low, and then in step 2, it is judged whether or not the sign change in the value of the difference has been detected by the sign change detection circuit 100J. In the case where the sign change has been detected, it is judged that the absolute value of the difference has become zero, and the control is terminated. On the other hand, in the case where the sign change has not been detected, the aforementioned circumstance as shown in (C) of FIG. 9 is judged, and control proceeds to step 3. In step 3, the control signal for instructing switching of the axis direction, is sent from the selector selection signal switching circuit 32 (FIG. 6) of the supervisory control circuit 100H, to the selector 100I. Then in step 4, the controls of other axis directions are continued. Note, termination of the control when the sign change is detected, is performed for example by sending a control signal for stopping the selection operation, from the selector selection signal switching circuit 32 to the selector 100I.

In this manner, according to the control apparatus of the second embodiment, by providing the sign change detection circuit, the constant control of the optical output level can be more reliably and stably performed.

Next is a description of a control apparatus for an optical signal exchanger according to a third embodiment of the present invention.

In the case where the conventional control for minimizing the optical loss of the optical signal exchanger is performed, the combination of the optimum angles of the respective MEMS mirrors is only one. In contrast to this, in the case where the constant control of the optical output level is performed as described in the abovementioned first and second embodiments, the combination of the optimum angles of the respective MEMS mirrors becomes multiple. Moreover, as described for the second embodiment, there also exists the case where it is difficult to complete the control using only one axis direction. Taking into consideration such a characteristic in the constant control of the optical output level, in the third embodiment, a description is given for an improved example that enables the angle controls of a plurality of axis directions to be efficiently performed with a series of processes.

FIG. 11 is a functional block diagram showing a constitution of an essential part of a comparison control section used in the control apparatus of the third embodiment.

In FIG. 11, in the control apparatus of the third embodiment, a comparison signal receiving circuit 41 and a counter control value generating circuit 42 are provided in the counter control signal generating circuit 100G of the comparison control section 100, instead of the abovementioned polarity inversion circuit 40 shown in FIG. 6, and a memory 34 and a CPU 35 are provided in the supervisory control circuit 100H, instead of the abovementioned polarity inversion signal generating section 30 shown in FIG. 6. The constitution other than the above is the same as that in the case of the second embodiment.

The comparison signal receiving circuit 41 of the counter control signal generating circuit 100G receives a signal indicating the result of comparison by the comparison circuit 100F, and transmits this signal to the counter control value generating circuit 42 in accordance with a control signal from the CPU 35 of the supervisory control circuit 100H. The counter control value generating circuit 42, based on the comparison result transmitted via the comparison signal receiving circuit 41, determines a counter control value corresponding to the control signal that has been sent from the CPU 35, to output the counter control value to the selector 100I.

The memory 34 of the supervisory control section 100H is a known storage medium capable of storing the result of comparison by the comparison circuit 100F. The CPU 35, based on the respective output signals from the H/L detection circuit 31 and the initial start up circuit 33, and also stored information in the memory 34, determines a direction to which the angle of each MEMS mirror is changed, that is to say, a control direction to which the absolute value of the difference of the output light power to the target value approaches zero, to control all of the angle correction for the respective MEMS mirrors.

Figure 12:
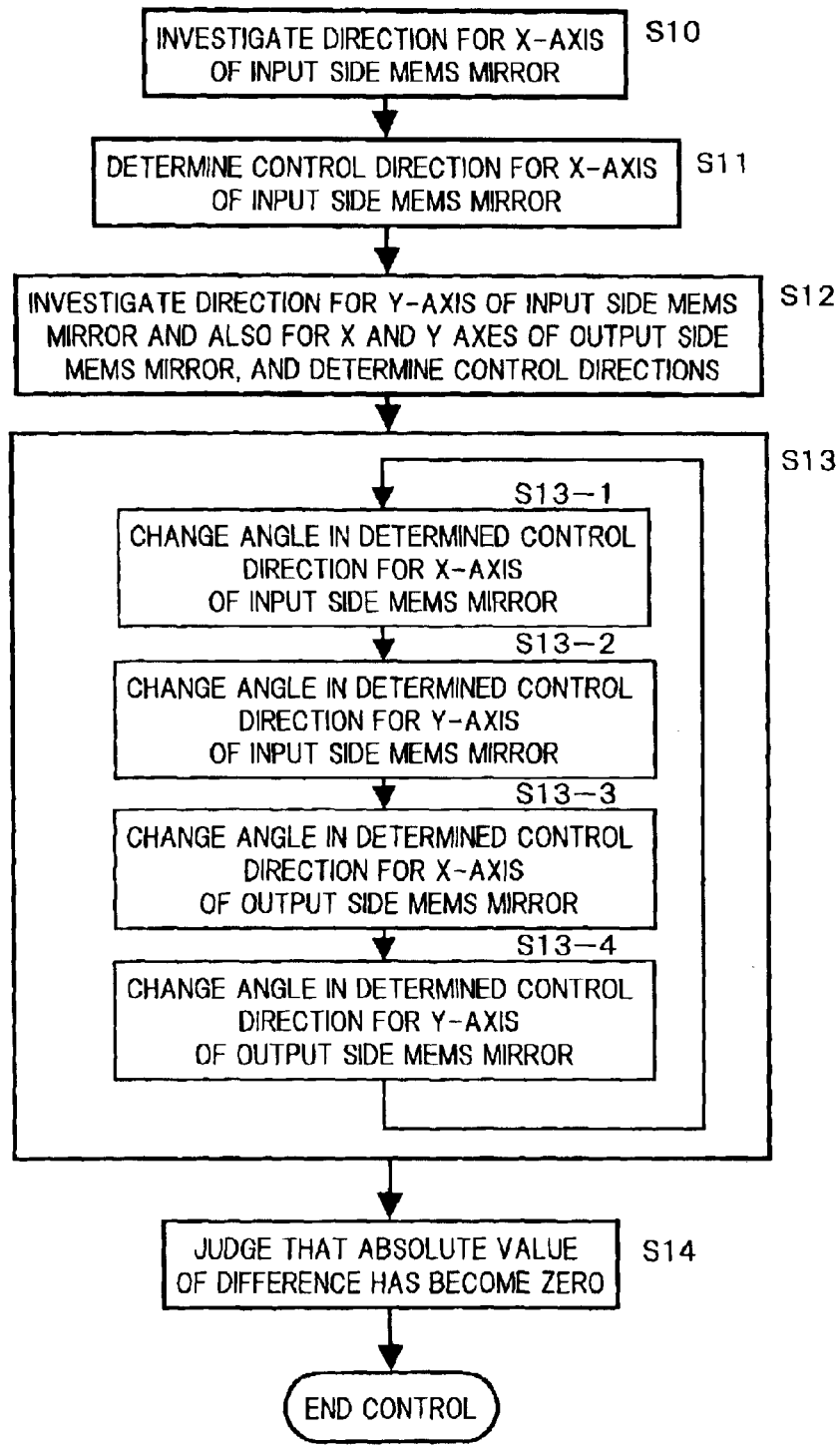
FIG. 12 is a flowchart for explaining a control operation in the third embodiment.

In the control apparatus of the optical signal exchanger of the abovementioned constitution, for example as shown in a flowchart of FIG. 12, at first in step 10, in a so called initial state before moving each MEMS mirror, for example, the count value of the U/D counter 21X of the MEMS mirror drive section 14A is changed so that the corresponding MEMS mirror is moved in one direction, and the comparison result by the comparison circuit 100F which reflects this change, is stored in the memory 34 (direction investigation).

In step 11, the CPU 35 refers to the stored information in the memory 34, to determine a direction to which the relevant MEMS mirror is controlled, that is to say, the control direction to which the absolute value of the difference to the target value approaches zero, and saves the result of determination in the memory 34. At the time of determining this control direction, as described above, if the output of the comparison circuit 100F is at a high level relative to the direction to which each MEMS mirror is moved from the initial state, then this direction becomes the control direction, while if the output of the comparison circuit 100F is at a low level, a direction opposite to the direction to which each MEMS mirror is moved from the initial state becomes the control direction.

Then in step 12, the control directions for the U/D counter 21Y of the MEMS mirror drive section 14A and the U/D counters 21X and 21Y of the MEMS mirror drive section 14B are sequentially determined to be stored in the memory 34, as with step 10 and step 11.

Once the control directions for the respective axes of the respective MEMS mirrors on the input side and the output side have been determined, then in step 13, the rotations of four control directions are made up by the CPU 35, and the constant control of the optical output level, the same as in the second embodiment, is sequentially executed for each one axis (step 13-1 through step 13-4). At this time, as shown in (C) of FIG. 9, there is the case where, during the controls of the respective axis directions, a minimum value is detected before the absolute value of the difference reaches zero. In this case, when the change from high level to low level is detected by the H/L detection circuit 31 of the supervisory control circuit 100H, without the sign change being detected by the sign change detection circuit 100J (FIG. 8) of the comparison control section 100, the CPU 35 sends a command to the counter control value generating circuit 42 and the selector selection signal switching circuit 32 so that the control of the relevant axis direction is terminated, and the controls of the other axis directions are continued in accordance with the abovementioned rotations.

Then, in step 14, after the detection of sign change by the sign change detection circuit 100J and the detection of level change by the H/L detection circuit 31 are confirmed, it is judged that the optical output level has reached the target value, and the overall control is terminated.

In this manner, according to the third embodiment, even in the case where, in the initial state of control, the control directions of the X-axis and Y-axis of the respective MEMS mirrors on the input side and the output side are determined and the rotations of the respective axis directions are made up, to perform the control, the constant control of the optical output level can be reliably and stably performed.

In the third embodiment, the modified example of the constitution of the second embodiment has been shown. However, this modified example can be similarly applied to the constitution of the first embodiment. In this case, so far as the target value of the optical output level is set so as not to exceed the maximum value of the output light power in the respective axis directions, the optical output level can be reliably controlled to the target value.

Figure 13:
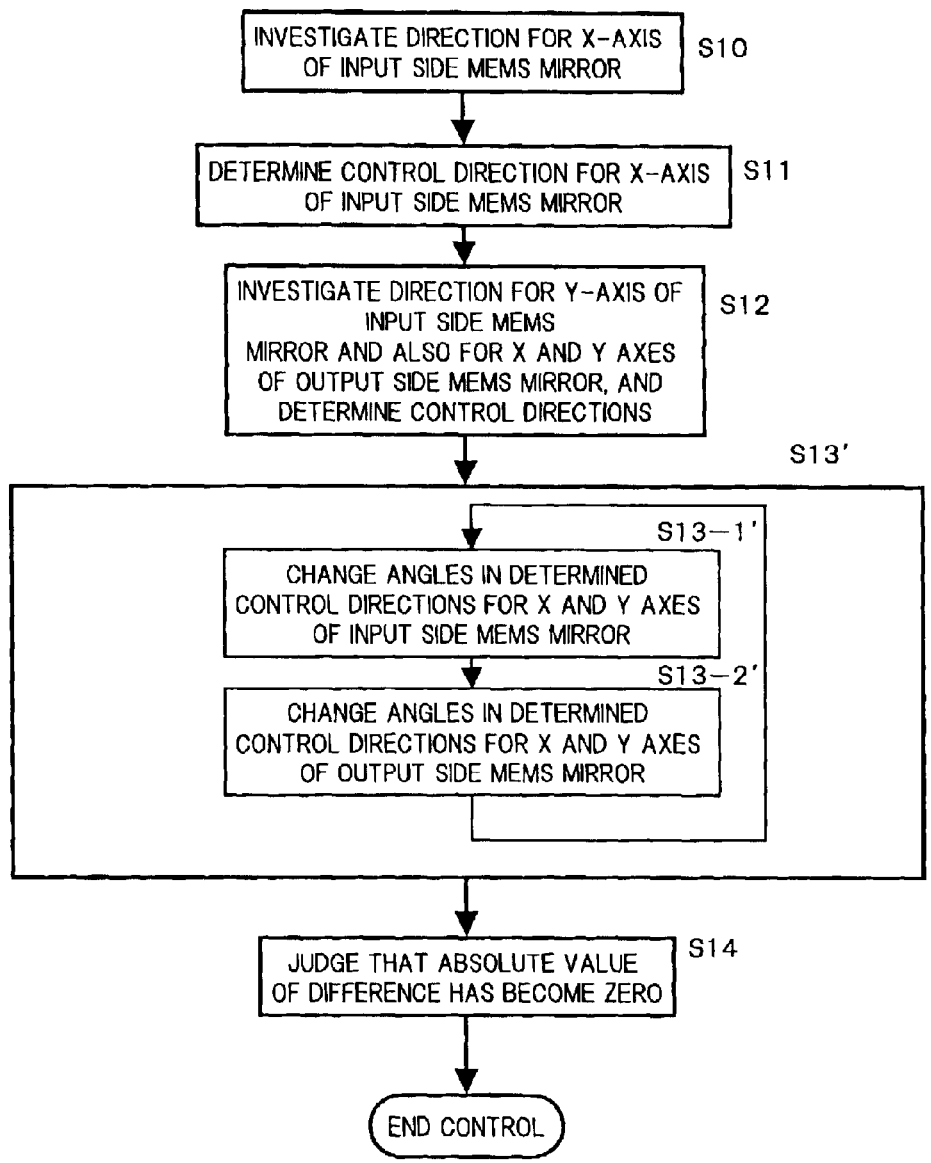
FIG. 13 is a flowchart for explaining an example of another control operation related to the third embodiment.

Further, in the third embodiment, the system has been such that the control directions of the X-axis and Y-axis of the respective MEMS mirrors on the input side and the output side are determined and the rotations are made up, to switch the control of each one axis. However, it is possible to perform the controls of the plurality of axis directions simultaneously after determining the respective control directions. More specifically, for example as shown in a flowchart of FIG. 13, it is possible to perform simultaneously the controls of the X-axis and Y-axis of the input side MEMS mirrors in step 13-1', and to perform simultaneously the controls of the X-axis and Y-axis of the output side MEMS mirrors in step 13-2'. If such a control system is adopted, then an effect the same as for the abovementioned case can be obtained, and also the control time for the optical output level to reach the target value can be shortened.

Figure 14:
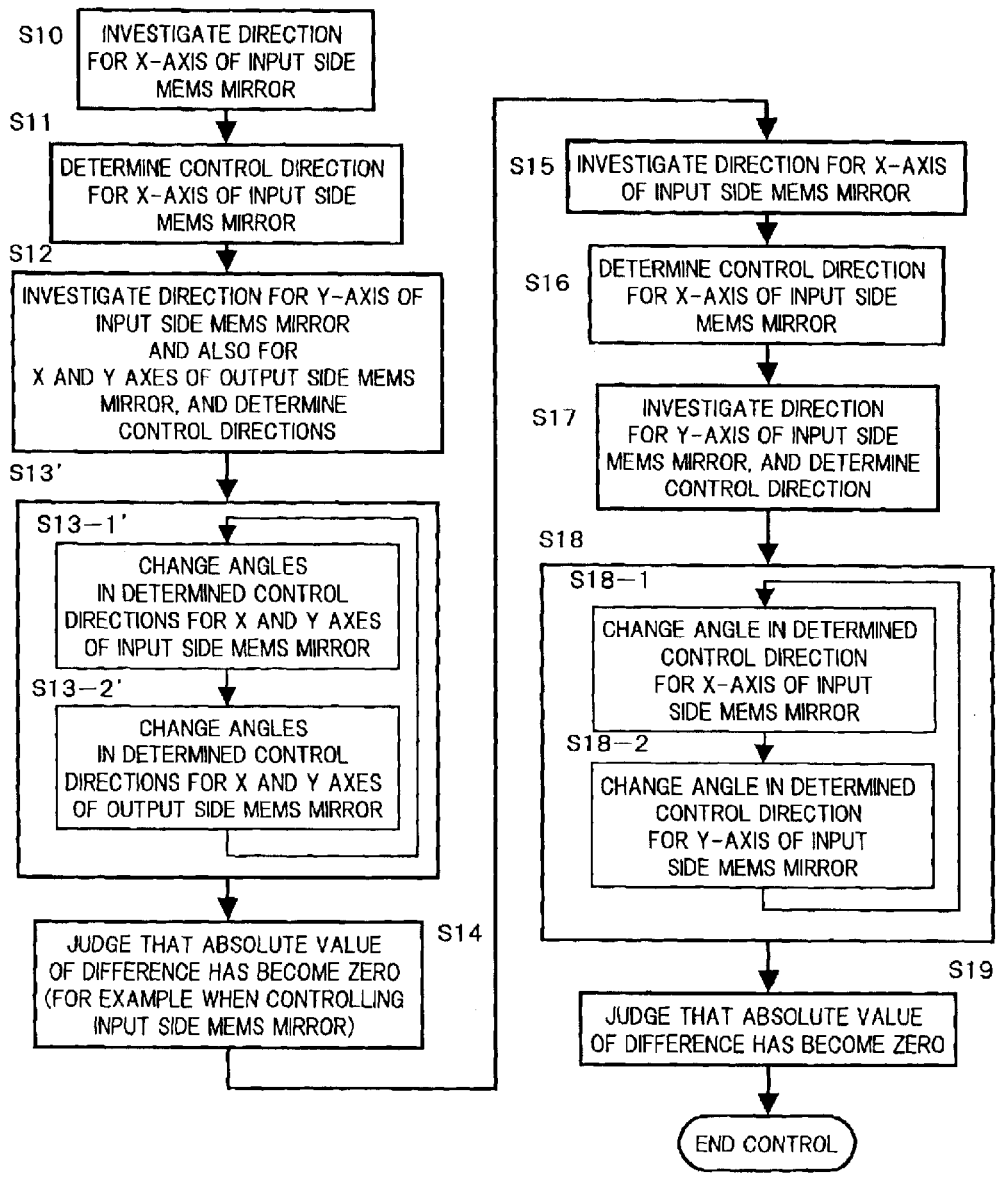
FIG. 14 is a flowchart for explaining an application example for achieving an improvement of accuracy in the control operation of FIG. 13.

However, in the case where the controls of the plurality of axis directions are performed simultaneously as described above, the control value per one control cycle becomes rougher compared to the case where the control is performed for each one axis, resulting in the reduction in control accuracy. In order to avoid such reduction in control accuracy, it is effective to perform the control in accordance with procedures shown for example in a flowchart of FIG. 14. That is to say, as in the flow chart of FIG. 13, if the respective processes of step 10 through step 14 are executed and it is judged that the absolute value of the difference reaches zero in any of the axis directions, then in step 15, after the series of control in accordance with the rotation is once stopped, the count value of the U/D counter 21X of the MEMS mirror drive section 14A is changed corresponding to a finally controlled direction (the X-axis and Y-axis direction of the input side MEMS mirror, in the example of FIG. 14), to perform the direction investigation. Then, in step 16, the control direction of the X-axis of the MEMS mirror on the input side is determined. Further, in step 17, the direction investigation is similarly performed for the Y-axis of the MEMS mirror on the input side, to determine the control direction. Then, in step 18, in accordance with the newly determined control direction the control of the MEMS mirror on the input side is performed for each one axis, and in step 19, it is judged that the absolute value of the difference reaches zero, thereby terminating the overall control. By adopting such a control system, the constant control of the optical output level can be performed in a short time, while maintaining the high accuracy.

Next is a description of a control apparatus for an optical signal exchanger according to a fourth embodiment of the present invention.

In the abovementioned third embodiment, the direction investigation is performed beforehand for the X-axis and Y-axis of the respective MEMS mirrors on the input side and the output side, to determine the control direction. In the fourth embodiment, a modified example is described where the initial values to be supplied to the U/D counters 21X and 21Y of the respective MEMS mirror drive sections 14A and 14B are specifically defined, so that the processing for determining the control direction as in the third embodiment can be omitted, to achieve the shortening of the processing time and the like.

Figure 15:
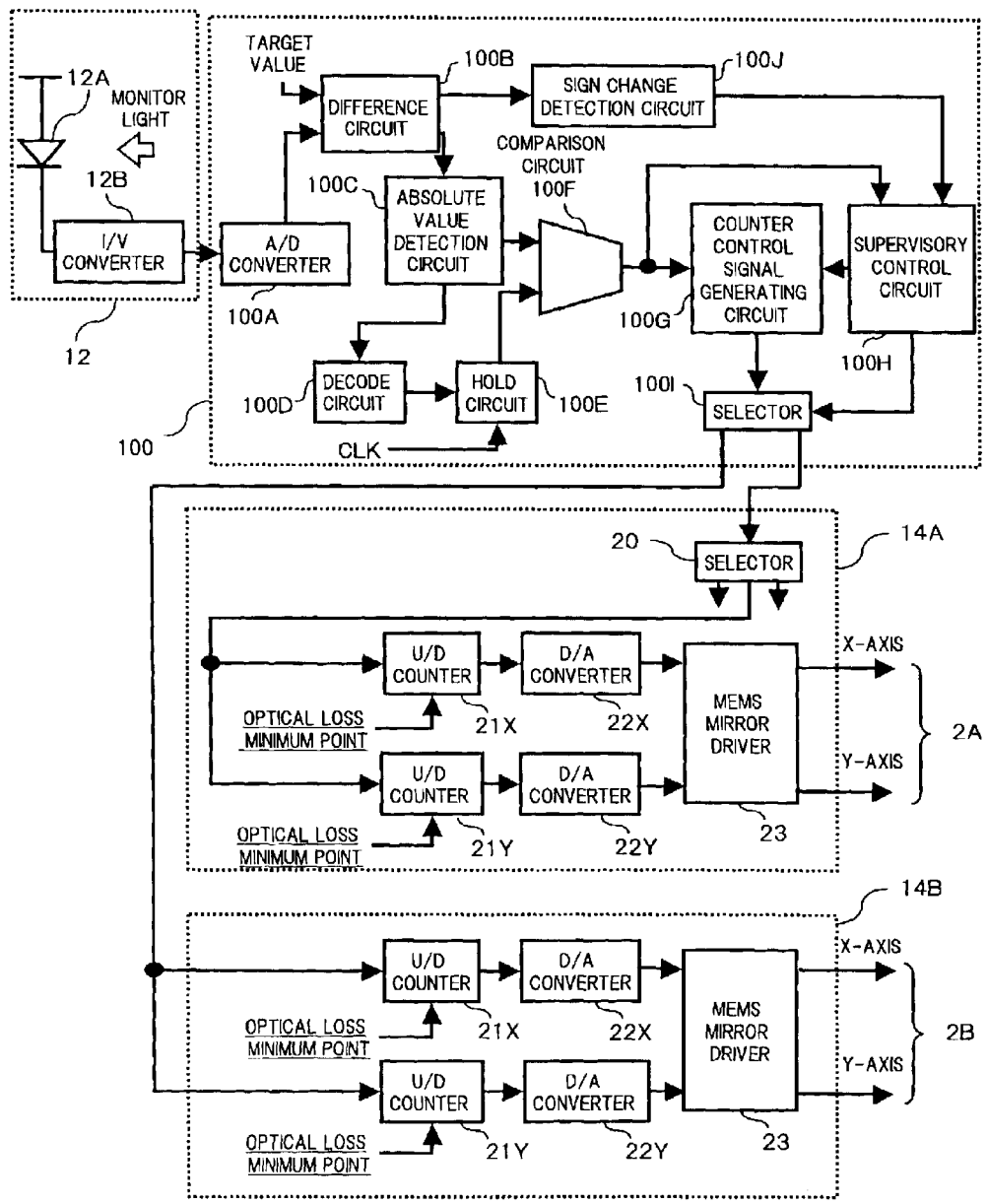
FIG. 15 is a functional block diagram showing a constitution of a control apparatus of an optical signal exchanger according to a fourth embodiment of the present invention.

FIG. 15 is a functional block diagram showing a constitution of the control apparatus of the optical signal exchanger according to the fourth embodiment.

In FIG. 15, the control apparatus of this embodiment is constituted such that, for example in the constitution of the second embodiment shown in FIG. 8, the count value equivalent to the point where the output light power becomes maximum, that is to say, the point where the optical loss inside the optical signal exchanger becomes minimum (hereunder the optical loss minimum point) is applied as the initial value to the U/D counters 21X and 21Y of the respective MEMS mirror drive sections 14A and 14B, corresponding to the combination of the input and output channels. The count value equivalent to the optical loss minimum point corresponding to the combination of the input and output channels, becomes a basically known value by determining the arrangement of optical system inside the optical signal exchanger. By supplying such a count value equivalent to the optical loss minimum point as the initial value in the initial state of the control, the angle of each MEMS mirror is set so that the output light power becomes close to the maximum value in any of the respective axis directions. Hence, no matter which direction the control direction is set, the output light power is changed to decrease (refer to FIG. 3 and FIG. 5). Therefore, different from the third embodiment, there is no longer necessary to perform the direction investigation in the initial state of the control of the respective axis directions to determine the control direction beforehand. As a result, it becomes possible to shorten the processing time for the constant control of the optical output level. And also, if the target value of the optical output level is set to be equal to or less than the maximum value of the output light power in the respective axis directions, it is possible to make the optical output level constant with the control of only one axis. Further, in the case where the target value is set to exceed the maximum value, the optical output level can be made constant by switching the controls of the plurality of axis directions.

Figure 16:
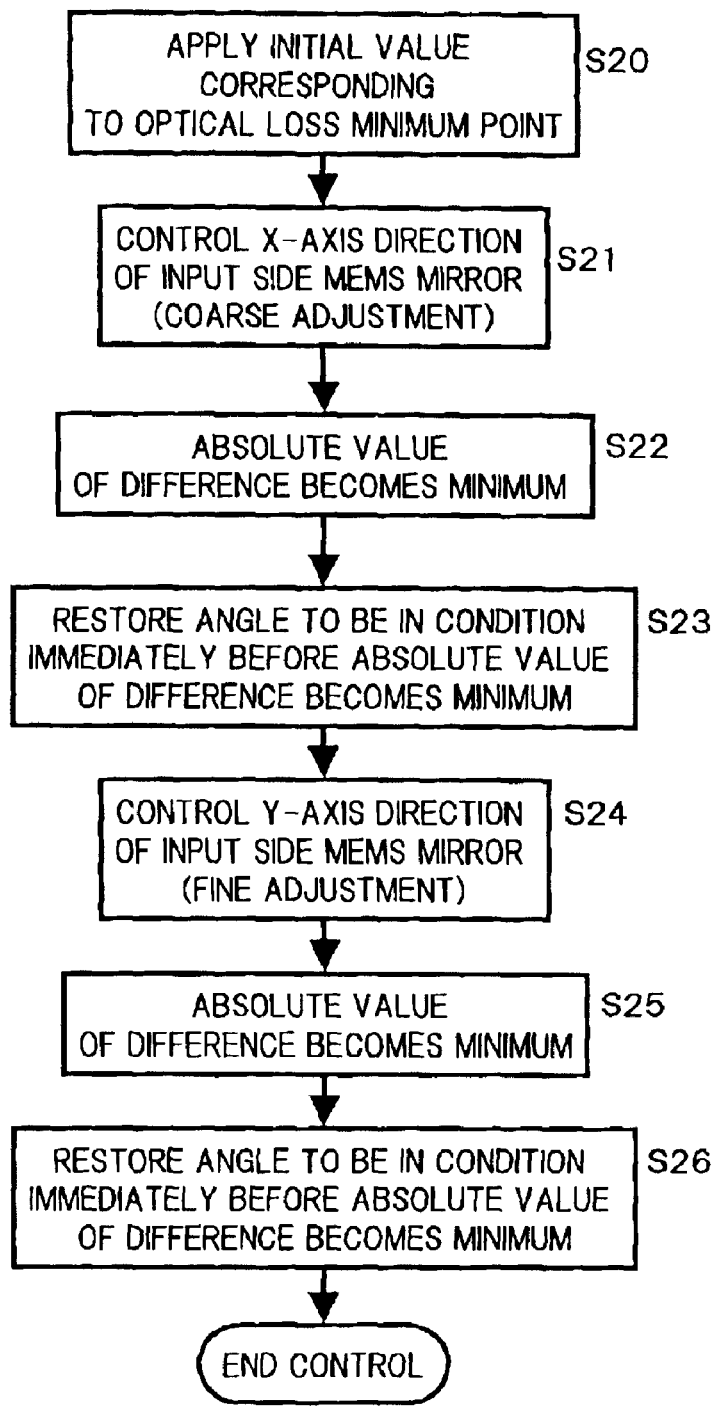
FIG. 16 is a flowchart for explaining a control operation in the fourth embodiment.

In the case of applying the above described control system where the count value equivalent to the optical loss minimum point is supplied as the initial value, in order to realize the control with higher accuracy, it is effective to control, for example in accordance with the procedures such as shown in a flowchart of FIG. 16. More specifically, at first in step 20, the initial value equivalent to the minimum point of the optical loss in each axis direction of the respective MEMS mirrors is supplied to each of the corresponding U/D counters. Then, in step 21, for example the count value of the U/D counter 21X of the MEMS mirror drive section 14A is increased or decreased, to perform the angle control of the X-axis direction of the input side MEMS mirror. Next, in step 22, if the point where the absolute value of the difference becomes minimum is detected, then in step 23, the angle of the X-axis direction of the input side MEMS mirror is restored to the state immediately before minimized.

Figure 17:
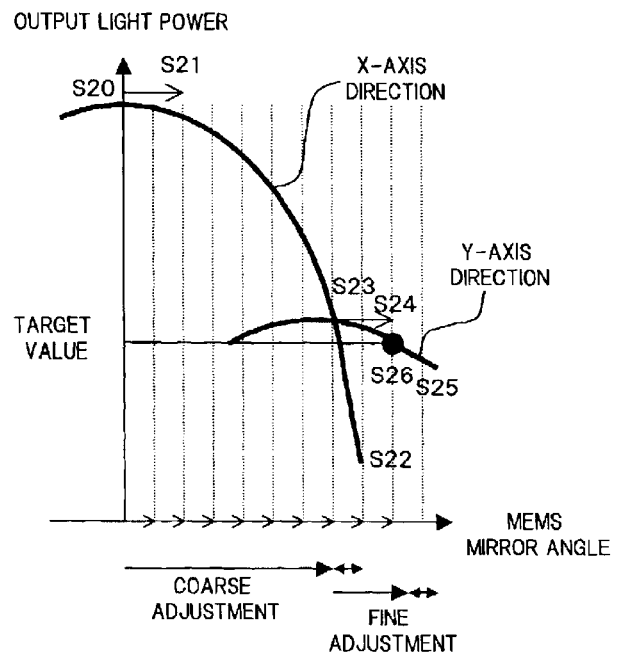
FIG. 17 is a conceptual diagram for explaining that accuracy in the control operation of FIG. 16 can be improved.

Next in step 24, the count value of the U/D counter 21Y of the MEMS mirror drive section 14A is increased or decreased, to perform the angle control of the Y-axis direction of the input side MEMS mirror. The accuracy of control at this time becomes higher compared to the accuracy of control of the X-axis of the input side MEMS mirror in step 21 through step 23. That is to say, as already shown in (A) of FIG. 3, the power of the light coupled to the output optical fiber is changed for each axis independently in accordance with the Gaussian distribution characteristics centered on the maximum point (optical loss minimum point) with respect to the angle change in the X-axis and Y-axis. Therefore, for example as shown in a conceptual diagram of FIG. 17, although the change in the output light power with respect to the angle change in the vicinity of the optical loss minimum point is small, the change in the output light power with respect to the angle change at a position away from the optical loss minimum point becomes great. Focusing on these change characteristics of the output light power with respect to the angle change, at first the coarse adjustment is performed in the X-axis direction of the input side MEMS mirror. Then the control is switched to the Y-axis direction, to perform the fine adjustment in the vicinity of the optical loss minimum point, thereby enabling the angle control with high accuracy. Next, in step 25, if the point where the maximum value of the difference becomes minimum is detected, then in step 26, the angle of the X-axis direction of the input side MEMS mirror is restored to the state immediately before minimized, and the overall control is terminated. The numbers affixed along the respective curves in FIG. 17 are the numbers corresponding to the respective steps in FIG. 16.

According to the fourth embodiment as described above, by supplying the count value equivalent to the optical loss minimum value as the initial value to perform the angle control of the MEMS mirror, it is possible to achieve the shortening of the control time. Moreover, by switching the controls of the two axis directions to perform the coarse adjustment and the fine adjustment, it becomes possible to achieve the control with even higher accuracy.

In the fourth embodiment, the description has been given assuming that in the case of performing the coarse adjustment and the fine adjustment, the axis direction for the coarse adjustment was one direction. However, a plurality of axis directions may be set for the coarse adjustment. For example, the constitution may be such that the coarse adjustment is performed simultaneously for the X-axis directions of the respective MEMS mirrors on the input side and the output side, and thereafter, the fine adjustment is performed for the Y-axis direction of the MEMS mirror on the input side or the output side. According to such a control system, even when the target value of the optical output level is set to be at a low level, the control time can be effectively shortened.

Figure 18:
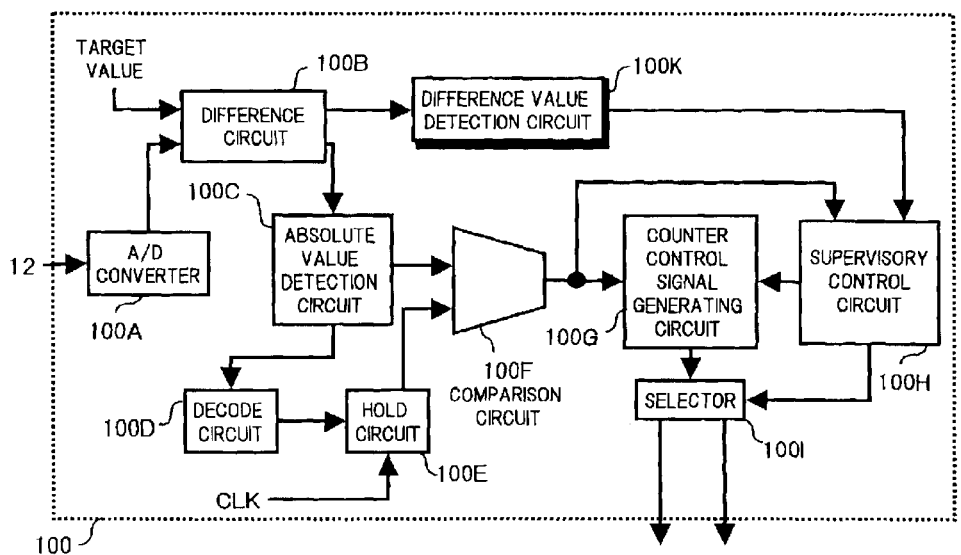
FIG. 18 is a block diagram showing another example related to the fourth embodiment.

Further, an application can be adopted where the above-mentioned coarse adjustment for a single axis direction and the coarse adjustment for a plurality of axis directions are switched to be performed according to the absolute value of the difference. More specifically, as shown in FIG. 18, in the comparison control section 100, there is provided a difference value detection circuit 100K that detects a difference value of the output light power to the target value calculated in the difference circuit 100B, to judge if the difference value exceeds a previously set threshold value, and the judgment result is transmitted to the supervisory control circuit 100H to control the selector selection signal switching circuit 32. As a result, in the case where the difference value is equal to or less than the threshold value, the coarse adjustment is performed for the single axis direction, while in the case where the difference value exceeds the threshold value, the coarse adjustment is simultaneously performed for the plurality of axis directions. By adopting such a control system, irregularities in the control time which occur according to differences in the desired optical output level that is set as the target value can be suppressed, enabling the constant control of the optical output level to be stably performed.

Next is a description of a control apparatus for an optical signal exchanger according to a fifth embodiment of the present invention.

In the fifth embodiment, a description is given of an application example where a function for judging whether or not the constant control of the optical output level is possible according to the setting of target value of the optical output level, is added to the control apparatus.

Figure 19:
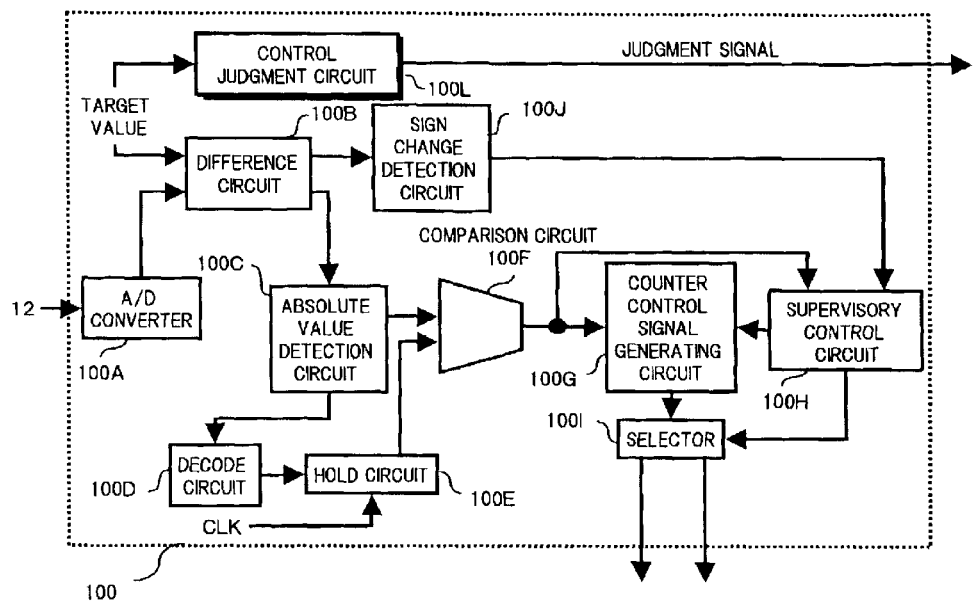
FIG. 19 is a functional block diagram showing a constitution of a comparison control section used in a control apparatus of a fifth embodiment of the present invention.

FIG. 19 is a functional block diagram showing a constitution of a comparison control section used in the control apparatus of the fifth embodiment.

In FIG. 19, the control apparatus of this embodiment is constituted such that, for example in the comparison control section 100 of the second embodiment shown in FIG. 8, there is provided a control judgment circuit 100L that judges whether or not the constant control of the optical output level as described in the second embodiment is possible according to the target value supplied to the difference circuit 100B, to output the judgment result to the exterior or the like. Constitution other than the control judgment circuit 100L is the same as that in the second embodiment.

The effective maximum level capable to be set as the target value of the optical output level is a known value (hereunder control upper limit value) uniquely determined by the optical input level and the loss for when the optical loss is adjusted to become minimum. Therefore, in this embodiment, a large/small comparison of the target value supplied to the difference circuit 100B and the control upper limit value is performed by the control judgment circuit 100L, and in the case where the target value is set to exceed the control upper limit value, it is judged that the control is not possible, and a judgment signal indicating the judgment result is output to the exterior. As a result, it becomes possible to transmit beforehand to the exterior a circumstance where in the present optical signal exchanger, the optical output level cannot be constantly controlled to the target value due to the optical input level and the optical loss.

In the fifth embodiment, in the case where the controls of four axis directions are completed without the sign change detection circuit 100J detecting even one sign change, the angle of each MEMS mirror is adjusted to the point where the optical loss becomes minimum without the optical output level reaching the target value. Such a circumstance means that an abnormality or the like has occurred in the optical signal to be input to the optical signal exchanger, and the defined optical input level is not satisfied. Therefore, by adding the function for detecting such a circumstance, it becomes possible to judge an abnormal occurrence in a system connected to a previous stage of the optical signal exchanger.

Figure 20:
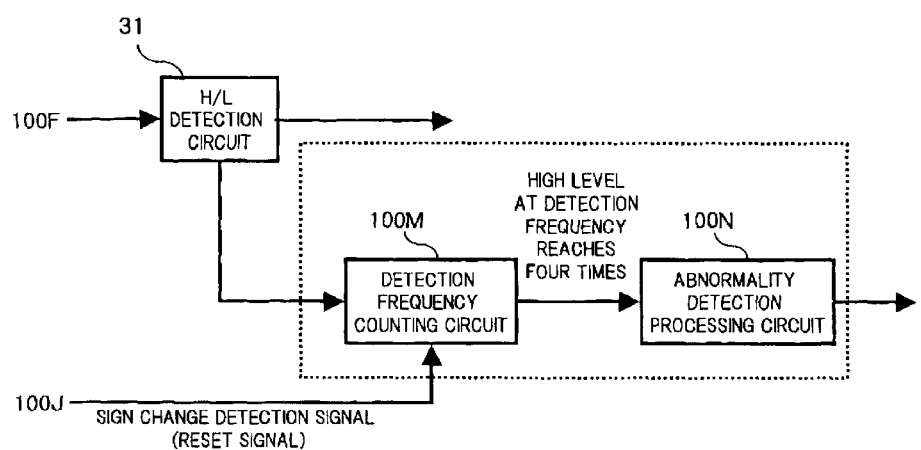
FIG. 20 shows an example where a function is provided for judging an abnormal occurrence in a system connected to a previous stage of the optical signal exchanger related to the fifth embodiment.

More specifically, as shown for example in FIG. 20, there is provided a detection frequency counting circuit 100M comprising a counter or the like that counts detection frequencies of change of from high level to low level in the H/L detection circuit 31 constituting the supervisory control circuit 100H, and an abnormality detection processing circuit 100N that detects the occurrence of an abnormality in the system on the previous stage side according to an output signal from the detection frequency counting circuit 100M. With such a constitution, in the detection frequency counting circuit 100M that is reset by the sign change detection signal output from the sign change detection circuit 100J, if the detection frequency of the level change in the H/L detection circuit 31 reaches four times, and a high level signal is output to the abnormality detection processing circuit 100N, the abnormality detection processing circuit 100N judges the occurrence of an abnormality in the system on the previous stage side to output a signal for transmitting the occurrence of an abnormality to the exterior. As a result, it becomes possible to improve the reliability of a communication system to which the present optical signal exchanger is applied.

Next is a description of a control apparatus for an optical signal exchanger according to a sixth embodiment of the present invention.

Since each of the above described respective embodiments is constituted to monitor the output light power to feedback control the angle of each MEMS mirror, then even if the optical input level is change at the time of switching of the channels in this optical signal exchanger, the optical output level can be controlled to be constant by correcting the angle of each MEMS mirror. However, the case is also assumed where the path switching or the like is performed on the system connected to the previous stage of the optical signal exchanger, so that the optical input level to the present optical signal exchanger drops suddenly although in momentary. In such a case, the output light power is monitored in a stage where the optical input level has dropped suddenly, and the constant control of the optical output level is performed. Hence, there is a possibility of an erroneous operation occurring due to outside factors that are not directly related to the operation of the optical signal exchanger. Therefore, in the sixth embodiment, an application example is described where a function for avoiding an erroneous operation due to such outside factors as described above is added to the control apparatus.

Figure 21:
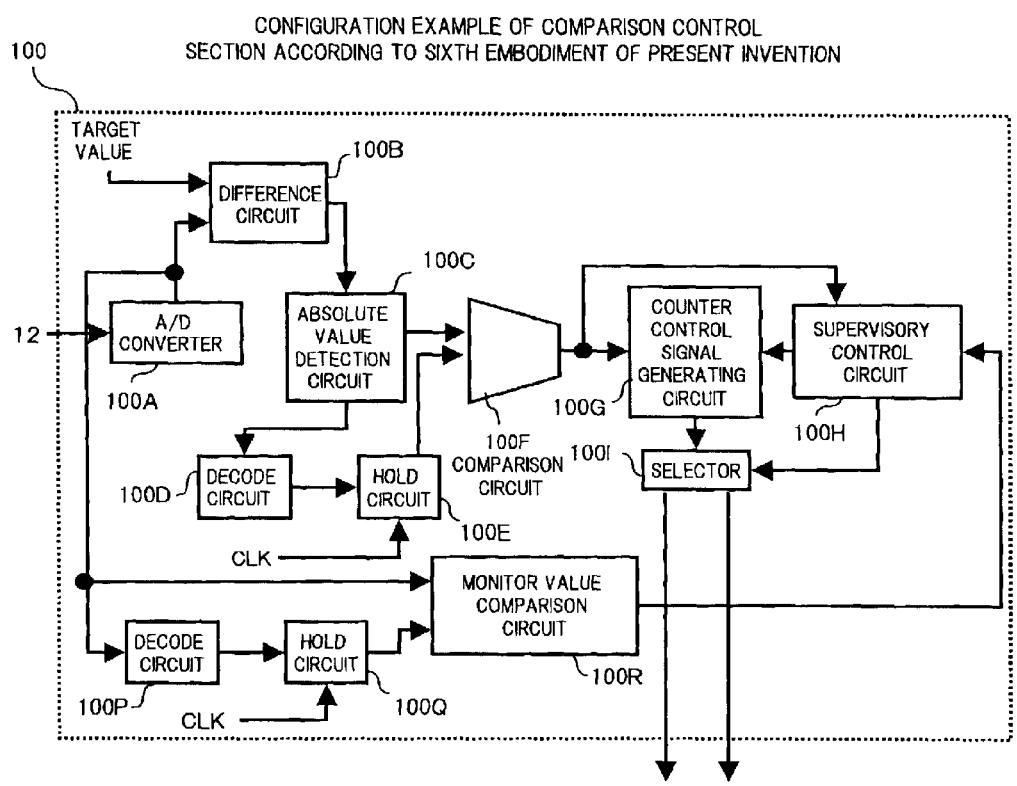
FIG. 21 is a functional block diagram showing a constitution of a comparison control section used in a control apparatus of a sixth embodiment of the present invention.

FIG. 21 is a functional block diagram showing a constitution of a comparison control section used in the control apparatus of the sixth embodiment.

In FIG. 21, the control apparatus of this embodiment is constituted such that, for example in the comparison control section 100 of the first embodiment shown in FIG. 1, there is provided a decode circuit 100P, a hold circuit 100Q and a monitor value comparison circuit 100R. The decode circuit 100P decodes the digital signal output from the A/D converter 100A to output to the hold circuit 100Q. The hold circuit 100Q that is input with a clock signal CLK of a required frequency, holds the output signal from the decode circuit 100P is held for a previously set fixed time, to thereafter send the output signal to one of the input terminals of the monitor value comparison circuit 100R. The monitor value comparison circuit 100R is a circuit that performs a large/small comparison between a voltage value represented by the digital signal from the A/D converter 100A to be supplied to the other input terminal, and a voltage value representing the digital signal from the hold circuit 100Q, and transmits the comparison result to the supervisory control circuit 100H.

In the above described constitution, in the case where the optical input level drops suddenly in momentary, the comparison value in the monitor value comparison circuit 100R is also decreased, according to the change in the optical input level. Therefore, the monitor value comparison circuit 100R, when detecting that the comparison value has dropped to the previously set (negative) threshold value or below, transmits a control signal for stopping the controls of the respective MEMS mirrors to the supervisory control circuit 100H. Then, when the sudden drop in the optical input level is recovered and the comparison value of the monitor value comparison circuit 100R exceeds the threshold value, a control signal to resume the stopped controls of the respective MEMS mirrors is transmitted to the supervisory control circuit 100H.

In this manner, according to the sixth embodiment, in the case where the path switching is performed on the system connected to the previous stage of the optical signal exchanger so that the optical input level drops suddenly in momentary, the controls of the respective MEMS mirrors are stopped. Therefore, it becomes possible to avoid the erroneous operation of the optical signal exchanger due to external factors.

What is claimed are:

1. A control apparatus of an optical signal exchanger which includes a first mirror array and a second mirror array, each having a plurality of tilt mirrors arranged on a plane, each tilt mirror having a reflecting surface an angle of which is controllable, and which sequentially reflects an input optical signal by said first and second mirror arrays to output from a specific position, for controlling the angle of the reflecting surface of each of the tilt mirrors of said first and second mirror arrays, comprising:

an optical power detection unit that detects power of the optical signal output from said specific position; and an angle control unit that controls the angle of at least one of the reflecting surfaces of the tilt mirrors of said first and second mirror arrays, which have reflected the optical signal, so that the optical power detected by said optical power detection unit becomes constant at a target value set corresponding to said specific position;

wherein said angle control unit includes:

a first mirror drive section that changes stepwise the angle of the reflecting surface of each tilt mirror of said first mirror array in a constant control direction;

a second mirror drive section that changes stepwise the angle of the reflecting surface of each tilt mirror of said second mirror array in a constant control direction; and a comparison control section that calculates absolute values of differences between said target value and respective values of the output light power that are detected by said optical power detection unit immediately before and after the angle of the reflecting surface is changed by at least one of said first mirror drive section and said second mirror drive section to compare the absolute values with each other, and determines respective control directions in said first mirror drive section and said second mirror drive section based on said comparison result, to feedback control the angle of the reflecting surface so that the absolute values of said differences become minimum.

2. A control apparatus according to claim 1, wherein said comparison control section includes:

a difference circuit that obtains a difference between said target value and a value of the optical power detected by said optical power detection unit;

an absolute value detection circuit that detects the absolute value of the difference obtained by said difference circuit;

a hold circuit that holds a signal indicating the absolute value detected by said absolute value detection circuit for a constant time, to then output said signal;

a comparison circuit that compares an output signal from said absolute value detection circuit and an output signal from said hold circuit, and outputs a signal having a level which is changed according to a large/small relation of the absolute values indicated by the respective output signals;

a control signal generating circuit that generates a control signal for determining respective control directions in said first mirror drive section and said second mirror drive section, in accordance with the level of the output signal from said comparison circuit; and a supervisory control circuit that supervises the output signal from said comparison circuit to control the operation setting of said control signal generating circuit.

3. A control apparatus according to claim 1, wherein said comparison control section detects a sign change of a difference between said target value and a value of the output light power detected by said optical power detection unit, and switches the tilt mirrors to be angle controlled or axis directions of the reflecting surfaces of said tilt mirrors, based on the comparison result of the absolute value of said difference and the detection result of said sign change.

4. A control apparatus according to claim 1, wherein said comparison control section, for respective axes of the reflecting surfaces of the respective tilt mirrors of said first and second mirror arrays, in an initial state before feedback controlling the angles of the reflecting surfaces, investigates to determine control directions where the value of the output light power detected by said optical power detection unit approximates to said target value, and sequentially switches the feedback control for each axis in accordance with each of said determined control directions.

5. A control apparatus according to claim 4, wherein said comparison control section performs the feedback control simultaneously for at least two axes of a plurality of axes, in accordance with said determined respective control directions.

6. A control apparatus according to claim 4, wherein said comparison control section performs the feedback control simultaneously for at least two axes of a plurality of axes, in accordance with said determined respective control directions, and then performs the feedback control for another axis.

7. A control apparatus according to claim 1, wherein said comparison control section, for respective axes of the reflecting surfaces of the respective tilt mirrors of said first and second mirror arrays, in an initial state before feedback controlling the angles of the reflecting surfaces, initially sets the angles of the reflecting surfaces so that an optical loss with respect to the optical signal output from said specific position becomes minimum, and then feedback controls in accordance with an arbitrary control direction with respect to at least one axis of a plurality of axes.

8. A control apparatus according to claim 7, wherein said comparison control section, after said initial setting, performs the feedback control simultaneously in accordance with arbitrary control directions with respect to at least two axes of the plurality of axes.

9. A control apparatus according to claim 7, wherein said comparison control section, after said initial setting, coarsely adjusts the angle of the reflecting surface in an arbitrary control direction with respect to at least one axis of the plurality of axes, and then finely adjusts the angle of the reflecting surface in an arbitrary control direction with respect to another axis of the plurality of axes, to perform the feedback control.

10. A control apparatus according to claim 9, wherein the number of axes for coarsely adjusting the angle of said reflecting surface is set according to a value of a difference between said target value and the value of the output light power detected by said optical power detection unit.

11. A control apparatus according to claim 1, wherein said angle control unit comprises a control judgment section that judges whether or not said target value is set to exceed a range in which said target value is controllable, to output a signal informing that the control is not possible, in accordance with said judgment result.

12. A control apparatus according to claim 3, wherein said angle control unit comprises an abnormality detection processing section that detects an abnormality of the optical signal input to the optical signal exchanger when the absolute value of the difference for all of the axis directions becomes minimum, without detecting a sign change of said difference.

13. A control apparatus according to claim 1, wherein said angle control unit stops the control of the angle of said reflecting surface when a change amount in the optical power detected by said optical power detection unit exceeds a previously set value.

14. A control method of an optical signal exchanger which includes a first mirror array and a second mirror array, each having a plurality of tilt mirrors arranged on a plane, each tilt mirror having a reflecting surface an angle of which is controllable, and which sequentially reflects an input optical signal by said first and second mirror arrays to output from a specific position, for controlling the angle of the reflecting surface of each of the tilt mirrors of said first and second mirror arrays, comprising:

detecting power of the optical signal output from the specific position; and controlling the angle of at least one of the reflecting surfaces of the tilt mirrors of the first and second mirror arrays, which have reflected the optical signal, so that the optical power detected becomes constant at a target value set corresponding to the specific position, said controlling comprising:

changing stepwise the angle of the reflecting surface of each tilt mirror of the first mirror array in a constant control direction;

changing stepwise the angle of the reflecting surface of each tilt mirror of the second mirror array in a constant control direction; and calculating absolute values of differences between the target value and respective values of the output right power that are detected by said detecting immediately before and after the angle of the reflecting surface is changed by said changing of the angle of the reflecting surfaces of each tilt mirror of the first and second mirror arrays, to compare the absolute values with each other, and determining respective control directions based on the comparison result, to feedback control the angle of the reflecting surface so that the absolute values of the differences become minimums.

15. A control method of an optical signal exchanger which includes a first mirror array and a second mirror array, each having a plurality of tilt mirrors arranged on a plane, each tilt mirror having a reflecting surface an angle of which is controllable, and which sequentially reflects an input optical signal by said first and second mirror arrays to output from a specific position, for controlling the angle of the reflecting surface of each of the tilt mirrors of said first and second mirror arrays, comprising:

detecting power of the optical signal output from the specific position; and controlling the angle of at least one of the reflecting surfaces of the tilt mirrors of the first and second mirror arrays, which have reflected the optical signal, so that the optical power detected becomes constant at a target value set corresponding to the specific position, said controlling comprising:

changing the angle of the reflecting surface of each tilt mirror of the first mirror array in a constant control direction;

changing the angle of the reflecting surface of each tilt mirror of the second mirror array in a constant control direction; and calculating absolute values of differences between the target value and respective values of the output right power that are detected by said detecting immediately before and after the angle of the reflecting surface is changed by said changing of the angle of the reflecting surfaces of each tilt mirror of the first and second mirror arrays, to compare the absolute values with each other, and to control the angle of the reflecting surface so that the absolute values of the differences become minimums.

* * * * *

UNITED STATES PATENT AND TRADEMARK OFFICE
CERTIFICATE OF CORRECTION

PATENT NO. : 6,760,147 B2
DATED : June 6, 2004
INVENTOR(S) : Yuji Tochio et al.

It is certified that error appears in the above-identified patent and that said Letters Patent is hereby corrected as shown below:

Title page,
Item [56], References Cited, FOREIGN PATENT DOCUMENTS, please change "WO 0 565 276 B1" to -- EPO 0 565 276 B1 --.

Signed and Sealed this

Seventh Day of December, 2004

JON W. DUDAS
*Director of the United States Patent and Trademark Office*